United States Patent
Shinmyo et al.

(10) Patent No.: US 10,399,301 B2
(45) Date of Patent: Sep. 3, 2019

(54) INCOMBUSTIBLE DECORATIVE SHEET, METAL DECORATIVE MEMBER AND METHOD FOR FABRICATING A METAL DECORATIVE MEMBER

(71) Applicant: TOPPAN PRINTING CO., LTD., Tokyo (JP)

(72) Inventors: Katsuyuki Shinmyo, Tokyo (JP); Takashi Tominaga, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/639,779

(22) Filed: Jun. 30, 2017

(65) Prior Publication Data

US 2017/0297307 A1 Oct. 19, 2017

Related U.S. Application Data

(63) Continuation of application No. PCT/JP2015/002581, filed on May 22, 2015.

(30) Foreign Application Priority Data

Jan. 27, 2015 (JP) .................... 2015-013273
Jan. 27, 2015 (JP) .................... 2015-013287

(Continued)

(51) Int. Cl.
*B32B 7/02* (2019.01)
*B32B 15/08* (2006.01)

(Continued)

(52) U.S. Cl.
CPC ............... *B32B 15/08* (2013.01); *B32B 3/30* (2013.01); *B32B 7/12* (2013.01); *B32B 15/082* (2013.01);

(Continued)

(58) Field of Classification Search
CPC . C04B 35/522; C04B 41/009; C04B 41/5059; C04B 38/00; C04B 41/4531;

(Continued)

(56) References Cited

FOREIGN PATENT DOCUMENTS

| JP | S59-098845 A | 6/1984 |
|---|---|---|
| JP | S63-008983 B2 | 2/1988 |

(Continued)

OTHER PUBLICATIONS

Sendra et al (JP 2012056146 translation), Mar. 3, 2012.*

(Continued)

*Primary Examiner* — Lawrence D Ferguson
(74) *Attorney, Agent, or Firm* — Foley & Lardner LLP

(57) ABSTRACT

A decorative sheet which ensures good incombustibility, processability and weatherability along with weatherability, contamination resistance and solvent resistance. An incombustible decorative sheet having incombustibility includes a weather-resistant resin layer and a fluorine resin layer laminated on a substrate layer in this order, wherein the weather-resistant resin layer is made of a mixture of an acrylic resin and an acrylic resin-based rubber having a ratio by mass between the acrylic resin-based rubber and the acrylic resin within a range of 30:70 to 60:40. The ratio between the fluorine resin layer and the weather-resistant resin layer is within a range of 10:90 to 40:60.

21 Claims, 3 Drawing Sheets

(30) Foreign Application Priority Data

| Jan. 30, 2015 | (JP) | 2015-017200 |
|---|---|---|
| Jan. 30, 2015 | (JP) | 2015-017201 |
| Feb. 10, 2015 | (JP) | 2015-024087 |
| Feb. 10, 2015 | (JP) | 2015-024088 |
| Feb. 10, 2015 | (JP) | 2015-024089 |
| Feb. 10, 2015 | (JP) | 2015-024090 |
| Feb. 10, 2015 | (JP) | 2015-024366 |
| Feb. 25, 2015 | (JP) | 2015-035146 |
| Feb. 25, 2015 | (JP) | 2015-035147 |
| Feb. 25, 2015 | (JP) | 2015-035148 |

(51) Int. Cl.

| B32B 7/12 | (2006.01) |
|---|---|
| B32B 15/20 | (2006.01) |
| B32B 27/30 | (2006.01) |
| B32B 27/36 | (2006.01) |
| B32B 37/06 | (2006.01) |
| E04B 1/94 | (2006.01) |
| E04F 13/07 | (2006.01) |
| B32B 27/00 | (2006.01) |
| B32B 15/082 | (2006.01) |
| B32B 15/085 | (2006.01) |
| B32B 15/088 | (2006.01) |
| B32B 15/09 | (2006.01) |
| B32B 15/18 | (2006.01) |
| B32B 27/08 | (2006.01) |
| B32B 27/16 | (2006.01) |
| B32B 27/18 | (2006.01) |
| B32B 27/20 | (2006.01) |
| B32B 27/32 | (2006.01) |
| B32B 27/34 | (2006.01) |
| B32B 3/30 | (2006.01) |
| B32B 38/18 | (2006.01) |
| E04F 13/00 | (2006.01) |

(52) U.S. Cl.
CPC .......... *B32B 15/085* (2013.01); *B32B 15/088* (2013.01); *B32B 15/09* (2013.01); *B32B 15/18* (2013.01); *B32B 15/20* (2013.01); *B32B 27/00* (2013.01); *B32B 27/08* (2013.01); *B32B 27/16* (2013.01); *B32B 27/18* (2013.01); *B32B 27/20* (2013.01); *B32B 27/30* (2013.01); *B32B 27/302* (2013.01); *B32B 27/304* (2013.01); *B32B 27/306* (2013.01); *B32B 27/308* (2013.01); *B32B 27/32* (2013.01); *B32B 27/322* (2013.01); *B32B 27/34* (2013.01); *B32B 27/36* (2013.01); *B32B 27/365* (2013.01); *B32B 37/06* (2013.01); *B32B 38/1866* (2013.01); *E04B 1/942* (2013.01); *E04F 13/07* (2013.01); *B32B 2255/06* (2013.01); *B32B 2255/10* (2013.01); *B32B 2255/26* (2013.01); *B32B 2264/0207* (2013.01); *B32B 2264/102* (2013.01); *B32B 2270/00* (2013.01); *B32B 2307/3065* (2013.01); *B32B 2307/406* (2013.01); *B32B 2307/408* (2013.01); *B32B 2307/412* (2013.01); *B32B 2307/712* (2013.01); *B32B 2307/718* (2013.01); *B32B 2307/732* (2013.01); *B32B 2309/105* (2013.01); *B32B 2451/00* (2013.01); *E04F 13/002* (2013.01)

(58) Field of Classification Search
CPC ... C04B 2111/00405; C04B 2235/3826; C04B 2235/425; C04B 2235/614; C04B 2235/77; C04B 35/52; C04B 41/87; C01B 32/21; C23C 16/045; C23C 16/325
See application file for complete search history.

(56) References Cited

FOREIGN PATENT DOCUMENTS

| JP | H08-109291 A | 4/1996 |
|---|---|---|
| JP | H09-328834 A | 12/1997 |
| JP | H10-157006 A | 6/1998 |
| JP | H11-300905 A | 11/1999 |
| JP | 2000-318086 A | 11/2000 |
| JP | 2000-326451 A | 11/2000 |
| JP | 2003-019776 A | 1/2003 |
| JP | 2003-340973 A | 12/2003 |
| JP | 2004-249526 A | 9/2004 |
| JP | 2006-007460 A | 1/2006 |
| JP | 2006-281563 A | 10/2006 |
| JP | 2008-007709 A | 1/2008 |
| JP | 2009-214490 A | 9/2009 |
| JP | 2010-082826 A | 4/2010 |
| JP | 2010-214825 A | 9/2010 |
| JP | 2010-253858 A | 11/2010 |
| JP | 2012-056146 A | 3/2012 |
| JP | 2012-131112 A | 7/2012 |
| JP | 2012-233089 A | 11/2012 |
| JP | 2013-022836 A | 2/2013 |

OTHER PUBLICATIONS

International Search Report for International Patent Application No. PCT/JP2015/002581 dated Aug. 25, 2015.
Japanese Office Action dated Jan. 8, 2019 in corresponding application No. 2015-035146.
Japanese Office Action dated Nov. 6, 2018 in corresponding application No. 2015-024087.
Japanese Office Action dated Oct. 23, 2018 in corresponding application No. 2015-024089.
Japanese Office Action dated Oct. 23, 2018 in corresponding application No. 2015-024090.
Japanese Office Action dated Oct. 23, 2018 in corresponding application No. 2015-035146.
Japanese Office Action dated Oct. 23, 2018 in corresponding application No. 2015-035147.
Japanese Office Action dated Feb. 5, 2019 in corresponding application No. 2015-035148.

\* cited by examiner

INCOMBUSTIBLE DECORATIVE SHEET, METAL DECORATIVE MEMBER AND METHOD FOR FABRICATING A METAL DECORATIVE MEMBER

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/002581, filed on May 22, 2015, which is based upon and claims the benefit of priority of Japanese Patent Application No. 2015-013273, filed on Jan. 27, 2015; Japanese Patent Application No. 2015-013287, filed on Jan. 27, 2015; Japanese Patent Application No. 2015-017200, filed on Jan. 30, 2015; Japanese Patent Application No. 2015-017201, filed on Jan. 30, 2015; Japanese Patent Application No. 2015-024087, filed on Feb. 10, 2015; Japanese Patent Application No. 2015-024088, filed on Feb. 10, 2015; Japanese Patent Application No. 2015-024089, filed on Feb. 10, 2015; Japanese Patent Application No. 2015-024090, filed on Feb. 10, 2015; Japanese Patent Application No. 2015-024366, filed on Feb. 10, 2015; Japanese Patent Application No. 2015-035146, filed on Feb. 25, 2015; Japanese Patent Application No. 2015-035147, filed on Feb. 25, 2015; and Japanese Patent Application No. 2015-035148, filed on Feb. 25, 2015, the entireties of which are hereby incorporated by reference.

The present invention has been illustrated with reference to a limited number of embodiments herein, and the scope of claims of the invention should not be construed as limited thereto, and alterations of the embodiments based on the disclosure may be obvious to those skilled in the art.

TECHNICAL FIELD

This invention relates to an incombustible decorative sheet and also to a technique concerning a metal decorative member having the incombustible decorative sheet. The invention relates to an incombustible decorative sheet used, for example, for surface decorative materials such as of storage furniture, interior and exterior materials such as wall materials, ceiling materials and partitions used in buildings such as houses, architectural semi-exteriors materials (front doors, front door frames and window frames), bay window counters, and the like.

BACKGROUND

As to decorative sheets, there has been hitherto known a technique described, for example, in Patent Literature 1 (Number Paragraph of 0003). In the technique described the Patent Literature 1, an acrylic resin having excellent weatherability is used as an outermost layer 5.

However, although the acrylic resin is excellent in weatherability, contamination resistance, oil resistance and solvent resistance are low. Accordingly, the above conventional decorative sheet is apt to be attached with dirt, coupled with the problem that the attached dirt cannot be wiped off with a solvent. The above conventional decorative sheet also has a problem in that processability and incombustibility are low.

CITATION LIST

Patent Literature

[PTL 1] JP 2000-326451 A

SUMMARY OF THE INVENTION

Technical Problem

While attention has been focused on such a problem as set out above, the present invention has for its object the provision of a decorative sheet that allows for good incombustibility, processability and weatherability while ensuring weatherability, contamination resistance and solvent resistance, and also to a metal decorative member using the decorative sheet.

Solution to Problem

In order to solve the above problems, a decorative sheet according to one embodiment of the invention is an incombustible decorative sheet including two or more thermoplastic resin layers stacked on a substrate layer wherein an outermost layer 5 of the thermoplastic resin layers is a fluorine resin layer made of a fluorine resin, an inside layer other than the outermost layer 5 of the thermoplastic resin layers is a weather-resistant resin layer which is made of a mixture of an acrylic resin and an acrylic resin-based rubber and has a ratio by mass between the acrylic resin-based rubber and the acrylic resin within a range of 30:70 to 60:40, and a ratio in thickness between the fluorine resin layer and the weather-resistant resin layer is within a range of 10:90 to 40:60.

The incombustibility used herein means one wherein in an ignitability test using a cone calorimeter testing machine conforming to ISO 5660-1 and according to the fire protection and fireproofing test method and the performance evaluation standards based on Paragraph 9 of Article 2 of the Japanese Building Standards Act and Paragraph 2 of Article 108 of the Regulations of the Building Standards Act, there should be satisfied the requirements that: (1) a total heat value over 20 minutes after commencement of heating be not larger than 8 MJ/m2, (2) a maximum heat release rate do not exceed 200 KW/m2 continuously over 10 seconds for 20 minutes after commencement of heating, and (3) there be no cracks and voids, which are harmful for fire protection, over 20 minutes after commencement of heating. However, to be clear, the term "incombustibility" should not be interpreted to be total incombustibility under any and all conditions. Instead, the term should be interpreted as meaning the same level of incombustibility compared to the prior art or improved incombustibility properties compared to the prior art.

Advantageous Effects of the Invention

According to one embodiment, a weather-resistant resin layer and a fluorine resin layer are formed on a substrate layer in this order, thus ensuring weatherability, contamination resistance and solvent resistance.

The ratio by mass between the acrylic resin-based rubber and the acrylic resin both serving as the weather-resistant resin layer is set within a range of 30:70 to 60:40, and the ratio between the thickness of the fluorine resin layer and the thickness of the weather-resistant resin layer is set within a range of 10:90 to 40:60, the incombustibility, processability and weatherability of the decorative sheet can be all made good.

Hence, according to one embodiment of the invention, there can be provided a decorative sheet and a metal decorative member, which are able to make good all of incombustibility, processability and weatherability while ensuring weatherability, contamination resistance and solvent resistance.

DESCRIPTION OF REPRESENTATIVE EMBODIMENTS

Next, representative embodiments of the invention are described with reference to the drawings. However, the present invention has been illustrated with reference to a limited number of embodiments herein, and the scope of claims of the invention should not be construed as limited thereto, and alterations of the embodiments based on the disclosure may be obvious to those skilled in the art.

The drawings are schematic, and the relation between the thickness and the plane dimension and the ratios of the layer thicknesses differ from actual ones. The following embodiments exemplify configurations embodying the technical concept of the invention. The technical concept of the invention should not be construed as limiting materials, shapes and structures of constituent parts to those set out hereinafter. The technical concept of the invention may be altered in various ways within the technical scope defined in the claims set forth in the scope of claims.

Figure 1:
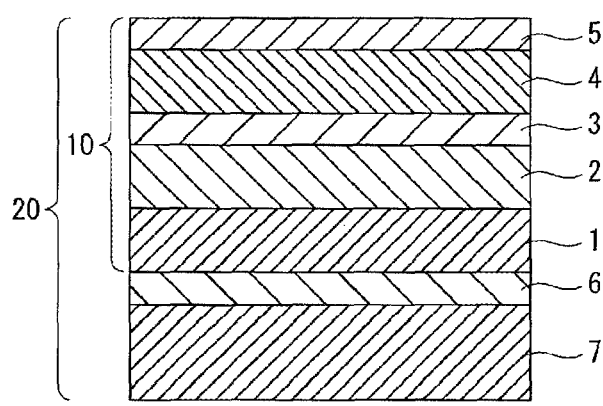
FIG. 1 is a sectional view showing an example of an incombustible decorative sheet and a metal decorative member related to embodiments of the invention.

A metal decorative member 20 of this embodiment includes an incombustible decorative sheet 10 and a metal substrate 7 as shown in FIG. 1. The incombustible decorative sheet 10 is such that a weather-resistant resin layer 4 and a fluorine resin layer 5 are stacked on one surface side of the substrate layer 1. The substrate layer 1 of the incombustible decorative sheet 10 is laminated, on the other surface side thereof, with the metal substrate 7 through an adhesive layer 6 serving as a second adhesive layer thereby providing a metal decorative member 20. This configuration permits the incombustible decorative sheet 10 and the metal decorative member 20 to have weatherability, contamination resistance and solvent resistance.

The incombustible decorative sheet 10 of the present embodiment is such an example that has a design pattern layer 2 between the substrate layer 1 and the weather-resistant resin layer 4, and the design pattern layer 2 and the weather-resistant resin layer 4 are bonded with an adhesion layer 3 as shown in FIG. 1. The design pattern layer 2 and the adhesion layer 3 may be omitted, respectively. Where the incombustible decorative sheet 10 has the design pattern layer 2, it is preferred that the adhesion layer 3, the weather-resistant resin layer 4 and the fluorine resin layer 5, respectively, have a transparency sufficient to enable the design pattern of the design pattern layer 2 to be made visible.

<Incombustible Decorative Sheet 10>

Initially, the configuration of the incombustible decorative sheet 10 is described.

(Substrate 1)

The substrate layer 1 is a sheet-shaped layer made of a thermoplastic resin. The thermoplastic resin is not specifically limited, for which known thermoplastic resins can be used. Examples of the thermoplastic resin include polyolefin resins such as polyethylene, polypropylene, polybutene, polymethylpentene and the like, polyolefin copolymers such as ethylene-vinyl acetate copolymer or a saponified product thereof, ethylene-(meth)acrylic acid (or ester) copolymer and the like, polyester resins such as polyethylene terephthalate, polybutylene terephthalate, polyethylene naphthalate, polyacrylates, polycarbonates, copolymerized polyesters (typical of which is a 1,4-cyclohexane dimethanol copolymerized polyethylene terephthalate resin commonly known as PET-G) and the like, acrylic resins such as polymethyl methacrylate and the like, polyamide resins such as 6-nylon, 6,6-nylon, 6,10-nylon, 12-nylon and the like, styrene resins such as polystyrene, AS resin, ABS resin and the like, cellulose derivatives such as cellulose acetate, nitro cellulose and the like, chlorine-based resins such as polyvinyl chloride, polyvinylidene chloride and the like, and fluorine resins such as polyvinyl fluoride, polyvinylidene fluoride, polytetrafluoroethylene, ethylene-tetrafluoroethylene copolymer and the like. The substrate layer 1 can be formed by using one, or two or three or more copolymers selected from those thermoplastic resins indicated above, or a mixture, a composite material or a laminate thereof. The substrate layer 1 may be admixed with a flame retardant, an ultraviolet absorber or the like to ensure flame retardance or a resistance to fading.

Especially, when consideration is taken to the productivity, environmental compatibility, mechanical strength, durability, costs and the like under the use of a melt extruder, a polyolefin resin is preferred as a thermoplastic resin. In doing so, no dioxin is generated upon combustion at the time of disposal. The polyolefin resin includes, for example, a polypropylene resin, a polyethylene resin or the like.

The thermoplastic resin is preferably colored polypropylene which is colored by mixing with at least any of an organic pigment and an inorganic pigment.

When the substrate layer 1 is colored, a metal substrate 7, to which the incombustible decorative sheet 10 is laminated, is concealed, and a hue serving as an underlying color of the design pattern layer 2 can be appropriately selected. For instance, the coloration can be performed, for example, by mixing or kneading a colorant such as a pigment. Alternatively, a colored layer may be provided beneath the design pattern layer 2 as a solid ink layer by use of a coating or printing technique prior to the provision of the design pattern layer 2.

In general, the incombustible decorative sheet 10 is frequently needed to conceal the color or defects of the surface of the adherend substrate 7. In order that an intended incombustible decorative sheet 10 has a concealed property, a concealing pigment is added to a thermoplastic resin for the substrate layer 1 and thus, the substrate layer 1 can have concealed property. Instead of the substrate 1 having the concealed property, a concealing layer made of a concealing pigment-containing print ink composition or paint may be formed on the front or back surface of the substrate layer 1, or both may be used in combination as a matter of course. In an opposite fashion, it may be of course possible that the substrate layer 1 is constituted of a transparent or semi-transparent material without provision of a concealing layer thereby providing a transparent or semi-transparent incombustible decorative sheet that can make use of the color tone and texture of the surface of the adherend substrate 7.

The colorants used include organic pigments and inorganic pigments (including titanium oxide). As an ultraviolet absorber, there can be used benzophenones, benzotriazoles, salicylates, cyanoacrylates, formamidines, oxanilides and hindered amines. Of these, benzotriazoles, oxanilides, hindered amines and mixtures thereof can be preferably used because of their excellent UV absorbability and excellent compatibility with olefin resins. Usable flame retardants include inorganic ones (such as aluminum hydroxide, magnesium hydroxide, antimony trioxide and the like), phosphorus ones (organic ones such as phosphoric acid esters, ammonium phosphate and the like, and inorganic ones such as red phosphorus), reaction type ones (such as vinyl compounds obtained by vinyl addition polymerization, and those compounds having a functional group such as a carboxylic acid group, a hydroxyl group, an epoxy group or the like and used as a part of starting materials of polymer, i.e. a co-polymerizable monomer). Of these, aluminum hydroxide and magnesium hydroxide can be preferably used because of their excellence in compatibility with polymers, flame retardant effect and environmental safety.

Where the substrate layer 1 is constituted of a polypropylene resin, it is preferred that the organic solid mass is from 44 $g/m^2$ to 67 $g/m^2$, inclusive. If a polypropylene resin is used for the substrate layer 1 within this range, incombustibility can be reliably ensured. In this case, the thickness of the substrate layer 1 is preferably from 50 μm to 75 μm, inclusive.

The thickness of the substrate layer 1 is preferably from 30 μm to 70 μm, inclusive, from the standpoint of processability and incombustibility and is more preferably from 50 μm to 70 μm from the standpoint of incombustibility.

(Design Pattern Layer 2)

The design pattern layer 2 is provided for the purpose of imparting designability with a desired design pattern to the incombustible decorative sheet. Accordingly, the design pattern layer 2 may not be particularly provided, for example, in the case that the above purpose can be satisfactorily achieved by the coloration of the substrate layer 1 or the formation of a concealing solid print layer like a plain decorative sheet provided only for the purpose of surface coloration or hue adjustment, or in the case that a design pattern is provided with a pigment kneaded in the substrate 1 itself or with a sublimable or melt migratable dye. In general, however, a design pattern layer 2 having an appropriate design has been frequently provided on the surface of the substrate layer 1 by means of a printing method.

The design pattern includes, for example, a grain pattern, a pebble pattern, a cloth pattern, an abstract pattern, a geometric pattern, a character or symbol pattern, or a combination of a plurality thereof.

The constituent materials and the formation method of the design pattern 2 are not limited at all, and arbitrary image-forming materials or image-forming methods, which have been hitherto applied for the design pattern layer 2 of decorative sheet can be appropriately applied. More particularly, there can be used a printing ink or paint obtained by dissolving or dispersing, in an appropriate solvent, a colorant such as a dye or pigment along with an appropriate type of binder resin.

The colorant includes, for example, an inorganic pigment such as carbon black, titanium white, zinc flower, colcothar, iron blue, cobalt blue or the like, an organic pigment such as an azo pigment, a lake pigment, an anthraquinone pigment, a phthalocyanine pigment, a quinacridone pigment, an isoindolinone pigment, a dioxazine pigment or the like, a metal powder pigment such as gold powder, silver powder, copper powder, aluminum powder, bronze powder or the like, a pearlescent pigment such as fish scale powder, basic lead carbonate, bismuth oxide chloride, titanium oxide-covered mica or the like, or a mixture of two or more selected therefrom.

Usable binder resins include, for example, an acrylic resin, a styrene resin, a polyester resin, a urethane resin, a polyvinyl resin, an alkyd resin, a petroleum resin, a ketone resin, an epoxy resin, a melamine resin, a fluorine resin, a silicone resin, a cellulose derivative, a rubber resin, or a mixture or copolymer of two or more thereof.

Besides, there may be further added, if necessary, various types of additives including, for example, an extender pigment, a plasticizer, a dispersing agent, a surfactant, a viscosity imparting agent, a thixotropy imparting agent, a thixotropic agent, a leveling agent, an adhesive aid, a drying agent, a stabilizer, a curing agent, a curing promoter, a curing retarder and the like.

In order that the decorative sheet has excellent interlayer adhesion, it is preferred to use, as a binder resin of the design pattern layer 2, a resin that exhibits strong adhesion and cohesion force. From this point of view, a crosslink curing resin, such as a thermosetting resin or an ionizing radiation curing resin, is preferably used. Of these, it is most preferred to use one containing as a main constituent at least a two-pack curing type urethane resin in view of the fact that it has appropriate degrees of flexibility and softness while showing a high cohesion force after crosslink curing and also shows excellent adhesion to an inert thermoplastic resin such as a polyolefin resin.

The manner of forming the design pattern layer 2 is not specifically limited. For instance, there can be used a number of hitherto known methods including a gravure printing method, an offset printing method, a screen printing method, a flexographic printing method, an electrostatic printing method, an inkjet printing method and the like. With the case of fully solid printing, for example, various coating methods may be used, aside from the above-indicated printing methods, including, for example, a roll coating method, a knife coating method, an air knife coating method, a die coating method, a lip coating method, a flow coating method and the like.

The printing ink is not particularly limited if printability and weatherability are properly taken into account, and known printing inks can be used. For example, use can be made of printing inks using, as a pigment, isoindolinone, disazo, polyazo, diketopyrrolopyrole, quinacridone, phthalocyanine, titanium oxide or carbon black. When pigments are formulated in combination, the appearance of design pattern can be made rich. Additionally, the addition of an ultraviolet absorber or a light stabilizer can lead to good weatherability.

Prior to the formation of the design pattern layer 2, if necessary, the substrate layer 1 may be subjected, for example, to an easy-to-adhesion treatment such as a corona treatment, an ozone treatment, a plasma treatment, an ionizing radiation treatment, an acid treatment, an alkali treatment, an anchor or primer treatment or the like, so that the adhesion between the substrate layer 1 and the design pattern layer 2 can be further improved.

The design pattern layer 2 is made mainly of a colorant and a resin. Usable colorants include organic and inorganic pigments that exhibit good light fastness and weatherability. The degrees of light fastness and weatherability often differ depending on the combination with a type of resin in which it is dispersed, for which an ultraviolet absorber and the like are appropriately used for compensation. Especially, there can be preferably used phthalocyanine blue, phthalocyanine green, perylene maroon, quinacridone red, anthraquinone red, perylene red, perinone orange, flavanthrone yellow, hanza yellow, which give a reduced mutual influence with resin and have good light fastness and weatherability. The use, as the above resin, of a vinyl chloride resin, a vinylidene chloride resin or a chlorinated polypropylene resin that undergoes an influence of light and an influence of an inorganic pigment and is thus liable to be deteriorated should be avoided. Instead, there can be used an ethylene-vinyl acetate copolymer, an ethylene-vinyl alcohol copolymer, an ethylene-vinyl butyral copolymer, a cellulose resin, a polyester resin, an acrylic resin, an alkyd resin having a hydroxyl group (—OH), an acrylic resin, a cellulose derivative resin, a polyol resin such as a polyvinyl alcohol resin, an amino resin having an amino group (—NH$_2$), or a two-part resin mixture including a resin having active hydrogen such as of a carboxylic acid having a carboxyl group (—COOH) and a polyisocyanate resin having an isocyanate group (—NCO). In view of the excellence in adhesion to upper and lower layers and also in layer flexibility, an ethylene-vinyl acetate copolymer and a two-part resin mixture (urethane ink) can be preferably used.

(Adhesion Layer 3)

The adhesion layer 3 is a sheet-shaped layer made of an adhesive. It will be noted that where a design pattern layer 2 is provided, the adhesion layer 3 should preferably have a transparency sufficient to allow the design pattern of the design pattern layer 2 to be made visible.

It is usual that the substrate layer 1 and the design pattern layer 2, and the weather-resistant resin layer 4 are, respectively, laminated through the adhesion layer 3 made of an appropriate type of adhesive. The adhesives include those of a solvent activation type, a heat activation type, a pressure activation type, a reaction curing type and the like, which can be arbitrarily selected depending on the use of the incombustible decorative sheet 10 and the type of material for the substrate layer 1. A dry lamination adhesive that is a kind of solvent activation-type and reaction curing-type adhesive, or a heat-sensitive adhesive (heat sealing agent) of the heat activation type is preferably usable.

The dry lamination adhesive is one wherein a coating solution obtained by dissolving a reaction precursor of an adhesive resin in an appropriate solvent is applied onto the adhesion surface of one or both of adherends and the solvent is removed by drying, followed by superposing both adherends and reaction curing for adhesion. A two-part curing urethane adhesive, which makes use of the reaction between a polyol such as a polyester polyol or a polyether polyol and a polyisocyanate compound such as tolylene diisocyanate, diphenylmethane diisocyanate, hexamethylene diisocyanate or the like, is the most typical one.

The heat-sensitive adhesive is solid at a normal temperature and is made mainly of a thermoplastic resin which develops adhesiveness after melting or softening by application of heat and has such properties of strongly bonding by solidification when cooled down. This is dissolved in an appropriate solvent or melted by heating and is applied onto the adhesion surface of one or both of the adherends, followed by superposing the both and heating under pressure for adhesion. The resin includes, for example, an ethylene-vinyl acetate copolymer resin, a vinyl chloride acetate resin, an acrylic resin, a polyurethane resin, a polyester resin, a polyamide resin, or a mixed resin of two or more thereof.

For the adhesion between the substrate layer 1 on which the design pattern layer 2 has been formed and the weather-resistant resin layer 4, there are required such low temperature adhesion that satisfactory adhesion is possible at relatively low temperatures sufficient not to thermally deform the both considerably and also such a cohesion force under heating that peeling does not occur by melting or softening at high temperatures within a temperature range under ordinary use conditions. As a resin satisfying the above requirements, there can be favorably used a heat sensitive adhesive made of an acrylic-polyester-vinyl chloride acetate resin.

This is one wherein while making use of the advantages of an acrylic resin and a vinyl chloride acetate resin, both capable of developing excellent adhesion by heating at relatively low temperatures, the characteristics of a polyester resin which exhibits reduced lowering of cohesion force under heating are added.

The formulation ratios of the respective resins preferably range 10 to 60 mass % for the acrylic resin, 10 to 60 mass % for the polyester resin and 10 to 60 mass % for the vinyl chloride acetate resin, respectively, and most preferably range 20 to 50 mass % for the acrylic resin, 20 to 50 mass % for the polyester resin, and 20 to 50 mass % for the vinyl chloride acetate resin.

To improve a peeling resistance in a high temperature atmosphere in the laminate using a heat sensitive adhesive, an effective technique is such that a high heat resistance is realized by formulating a crosslinking agent, such as an isocyanate compound, in a heat sensitive adhesive and crosslinking the heat sensitive agent by application of heat during thermal adhesion or in an aging step after thermal adhesion. For example, with the case of a heat-sensitive adhesive containing the above vinyl chloride acetate resin, when there are used a vinyl chloride acetate-polyol resin, which is obtained by saponifying part of the vinyl acetate component of the vinyl chloride acetate resin to introduce a hydroxyl group, and a isocyanate compound as a crosslinking agent, a vinyl chloride acetate-urethane resin capable of developing an excellent cohesion force under heating by the formation of an intermolecular crosslinking structure can be formed. It is to be noted that in the case where a period from the coating formation step of a heat-sensitive adhesive to a thermal adhesion step is long, the use of a block isocyanate compound as a crosslinking agent is advantageous in that the deactivation of an isocyanate compound such as with moisture is prevented thereby enabling stable thermal adhesion.

In this way, the adhesive is not specifically limited and known adhesives can be used. For instance, there can used thermoplastic resins such as polyamide resins, acrylic resins, vinyl acetate resins and the like and curing resins such as thermosetting urethane resins. Moreover, two-part curing urethane resins or polyester resins using an isocyanate as a curing agent may also be used.

In this embodiment, an acrylic resin-polyester resin-vinyl chloride acetate resin serving as a heat-sealing agent is used, for example, as a transparent adhesive.

Figure 2:
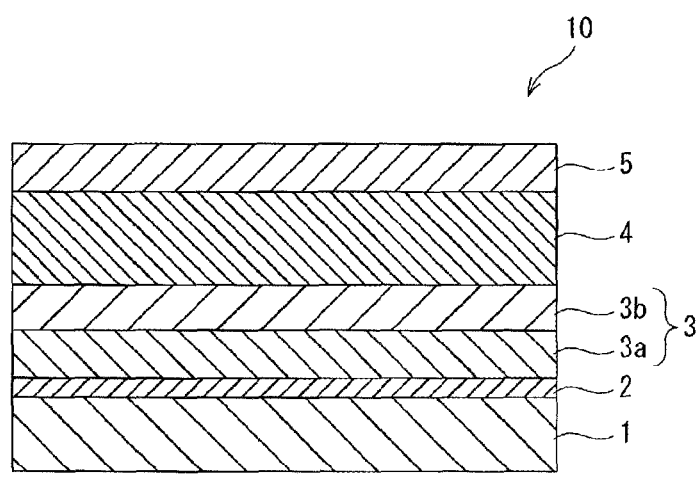
FIG. 2 is a sectional view illustrating an adhesion layer made of an adhesive layer and an anchor layer.

The adhesion layer 3 may be constituted of an adhesive layer 3a and an anchor layer 3b as shown in FIG. 2.

In this case, the adhesive layer 3a can be constituted of a urethane adhesive having a polyester resin as a main chain. The anchor layer 3b can be constituted of a urethane anchoring agent having an acrylic resin as a main chain.

The urethane adhesive having a polyester resin as a main chain and the urethane anchoring agent having an acrylic resin as a main chain, respectively, means those having a urethane bond by reacting an isocyanate with a polyester polyol and by reacting an isocyanate with an acrylic polyol.

It is preferred that an ultraviolet absorber is added to the urethane anchoring agent.

Examples of the ultraviolet absorber include benzophenones, benzotriazoles, salicylates, cyanoacrylates, formamidines, oxanilides and the like.

(Weather-Resistant Resin Layer 4)

The weather-resistant resin layer 4 is a thermoplastic resin layer, which is a sheet-shaped layer made of a mixture of an acrylic resin and an acrylic resin-based rubber. The weather-resistant resin layer 4 may be constituted of two or more layers.

The acrylic resin is not specifically limited, for which known acrylic resins can be used. For example, a methyl methacrylate resin and a polymethyl methacrylate resin (with Tg of approximately −20° C.) can be used. A polymethyl methacrylate resin-based rubber can be exemplified as an acrylic resin-based rubber.

Known ultraviolet absorbers and light stabilizers may be added to the acrylic resin.

Where an ultraviolet absorber is added, it is preferred that at least one ultraviolet absorber selected from benzotrizole ultraviolet absorbers and triazine ultraviolet absorbers is contained. The addition of an ultraviolet absorber is set, for example, at from 0.2% to 0.8%. If less than 0.2%, the effect of adding an ultraviolet absorber might become low. If over 0.8%, there is concern that a difficulty is involved in uniform addition.

The ultraviolet absorber to be added may be a single benzotriazole ultraviolet absorber or a single triazine ultraviolet absorber, or an admixture thereof.

The addition of an ultraviolet absorber can lead to an improvement in light fastness and weatherability (provided that addition sufficient to color the resin is not favorable).

The mixing ratio of the acrylic resin and the acrylic resin-based rubber is so set that the acrylic resin is from 40 mass % to 70 mass %, inclusive, and the acrylic resin-based rubber is from 30 mass % to 60 mass %, inclusive. This enables processability to be improved. The meaning of "the mixing ratio is such that the acrylic resin is from 40 mass % to 70 mass %, inclusive, and the acrylic resin-based rubber is from 30 mass % to 60 mass %, inclusive" indicates that the mixing ratio of the acrylic resin and the acrylic resin-based rubber is 4:6 to 7:3 by mass ratio.

The ratio by mass of the acrylic rubber and the acrylic resin is set at 30:70 to 60:40, under which when a total heat value relative to time and a heat release rate relative to time of a decorative plate obtained by laminating the incombustible decorative sheet 10 and a metal substrate are, respectively, determined by a cone calorie ignition test conforming to ISO 5660-1, there can be ensured incombustibility, which satisfies (i) a total heat value over 20 minutes after commencement of heating is not larger than 8 MJ/m$^2$, (2) a maximum heat release rate does not exceed 200 KW/m$^2$ continuously over 10 seconds for 20 minutes after commencement of heating, and (3) there are no cracks and voids, which are harmful for fire protection and are passed through a back surface, over 20 minutes after commencement of heating.

Here, when the mass ratio is smaller than 30:70, or when the amount of the acrylic rubber is smaller, excellent incombustibility cannot be obtained and bending processability lowers. On the other hand, when the mass ratio is larger than 60:40, or when the amount of the acrylic rubber is larger, a difficulty is involved in the formation of the weather-resistant resin layer 4, and the weatherability lowers. From this point of view, the mass ratio between the acrylic rubber and the acrylic resin is preferably at 30:70 to 60:40.

The thickness of the weatherability resin layer 4 is preferably from 30 to 80 μm, more preferably from 30 to 70 μm. If the thickness is not less than 30 μm, excellent weatherability is obtained. On the other hand, if not larger than 80 μm, excellent bending processability is obtained and incombustibility is also obtained.

The acrylic rubber constituting the weather-resistant resin layer 4 is not specifically limited and is preferably a synthetic rubber made of a polymer comprising at least a (meth)acrylic acid ester monomer as constituent units. The acrylic rubber should preferably not less than 60 mass %, more preferably not less than 70 mass % and much more preferably not less than 80 mass %, of the constituent units. Examples of the (meth)acrylic acid ester monomer include a (meth)acrylic acid alkyl ester, a (meth)acrylic acid alkoxyalkyl ester and the like.

The (meth)acrylic acid alkyl esters preferably include esters of alkanols having 1 to 8 carbon atoms and (meth)acrylic acid. Particular mention is made of methyl (meth)acrylate, ethyl (meth)acrylate, n-propyl (meth)acrylate, n-butyl (meth)acrylate, isopropyl (meth)acrylate, isobutyl (meth)acrylate, n-hexyl (meth)acrylate, 2-ethylhexyl (meth)acrylate, cyclohexyl (meth)acrylate, and the like. Of these, ethyl (meth)acrylate, and n-butyl (meth)acrylate are preferred.

The (meth)acrylic acid alkoxyalkyl esters preferably include esters of alkoxyalkanols having 2 to 8 carbon atoms and (meth)acrylic acid. Particular mention is made of methoxymethyl (meth)acrylate, ethoxyethyl (meth)acrylate, 2-ethoxyethyl (meth)acrylate, 2-butoxyethyl (meth)acrylate, 2-methoxyethyl (meth)acrylate, 2-propoxyethyl (meth)acrylate, 3-methoxypropyl (meth)acrylate, 4-methoxybutyl (meth)acrylate, and the like. Of these, 2-ethoxyethyl (meth)acrylate and 2-methoxyethyl (meth)acrylate are preferred. As a (meth)acrylic acid ester monomer, a polyfunctional (meth)acrylic acid ester monomer is preferably mentioned.

Examples of the polyfunctional (meth)acrylic acid ester monomer preferably include esters of unsaturated monocarboxylic acids such as (meth)acrylic acid and unsaturated alcohols such as allyl alcohol, diesters of the unsaturated monocarboxylic acids and glycols such as ethylene glycol, butanediol, hexanediol and the like, and esters of dicarboxylic acids such as phthalic acid, terephthalic acid, isophthalic acid, maleic acid and the like and the unsaturated alcohols. More particularly, mention is made of allyl (meth)acrylate, methallyl (meth)acrylate, allyl cinnamate, methallyl cinnamate, diallyl maleate, diallyl phthalate, diallyl terephthalate, diallyl isophthalate, divinyl benzene, ethylene glycol di(meth)acrylate, butanediol di(meth)acrylate, hexanediol di(meth)acrylate, and the like.

The acrylic rubber is preferably a copolymer containing constituent units having crosslinking points. The rubber composition using such a copolymer as an acrylic rubber allows crosslinkage to effectively proceed during molding thereby obtaining an elastic crosslinked product. The constituent units having a crosslinking point include those having a carboxyl group, a halogen atom, an epoxy group or a hydroxyl group.

Although the shape of the acrylic rubber is not specifically limited, particulate ones are preferred in view of workability. Where the acrylic rubber is in the form of particles, the average particle size is preferably from 30 nm to 150 nm, more preferably from 40 nm to 120 nm when consideration is taken to the transparency and the molding processability of the weather-resistant resin layer 4. The acrylic resin used for the weather-resistant resin layer 4 is not specifically limited, and a polymer comprising at least a (meth)acrylic acid ester as constituent units is preferred. More particularly, mention is preferably made of homopolymers of (meth) acrylic acid ester monomers, copolymers of two or more (meth)acrylic acid ester monomers that differ in type from each other, or copolymers of (meth)acrylic acid ester monomers and other type of monomer.

The (meth)acrylic acid ester monomers include, for example, methyl (meth)acrylate, ethyl (meth)acrylate, propyl (meth)acrylate, cyclohexyl (meth)acrylate, normal butyl (meth)acrylate, isobutyl (meth)acrylate, secondary butyl (meth)acrylate, tertiary butyl (meth)acrylate, isobonyl (meth)acrylate, 2-methyl-2-adamantyl (meth)acrylate, 2-ethyl-2-adamantyl (meth)acrylate, and the like. When bending processability and weatherability are taken into account, methyl (meth)acrylate is more preferred.

The copolymers of different types of two or more (meth) acrylic acid ester monomers include, for example, copolymers of two or more (meth)acrylic acid esters selected from those indicated above. These copolymers may be either a random copolymer or a block copolymer.

The other type of monomer used to form a copolymer along with a (meth)acrylic acid ester monomer is not specifically limited so far as it is copolymerizable with a (meth)acrylic acid ester. In the practice of the invention, mention is made of (meth)acrylic acid, styrene, (anhydrous) maleic acid, fumaric acid, divinyl benzene, vinyl biphenyl, vinyl naphthalene, diphenyl ethylene, vinyl acetate, vinyl chloride, vinyl fluoride, vinyl alcohol, acrylonitrile, acrylamide, butadiene, isoprene, isobutene, 1-butene, 2-butene, N-vinyl-2-pyrrolidone, alicyclic olefin monomers such as dicyclopentadiene, ethylidene norbornene, norbornenes and the like, vinyl caprolactam, citraconic acid anhydride, maleimides such as N-phenyl maleimide, vinyl ethers, and the like. Especially, styrene and (anhydrous) maleic acid are preferred as a copolymerization component. More particularly, preferred ones include a binary copolymer of a (meth) acrylic acid ester and styrene or (anhydrous) maleic acid, and a tertiary copolymer of a (meth)acrylic acid ester, styrene and (anhydrous) maleic acid. It will be noted that the copolymer of a (meth)acrylic acid ester and other type of monomer may be either a random copolymer or a block copolymer.

(Matte Sheet Layer 40)

Figure 3:
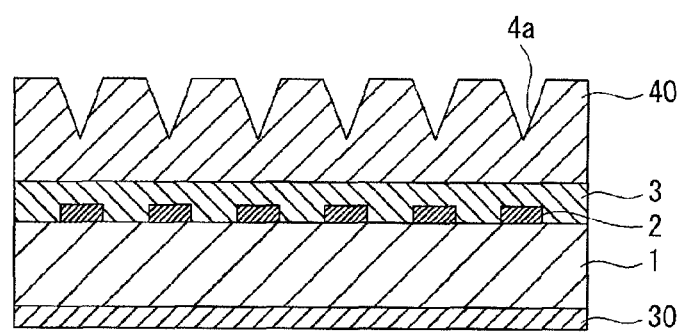
FIG. 3 is a sectional view illustrating a weather-resistant resin layer that constitutes a matte layer.

A matting agent may be added to the weather-resistant resin layer 4, so that the weather-resistant resin layer 4 is provided as a matte sheet layer 40 as shown in FIG. 3. It will be noted that in FIG. 3, a fluorine resin layer 5 is omitted.

That is, a matting agent is added to the matte sheet layer 40.

The organic crosslinked particles serving as a matting agent, which is added to the matte sheet layer 40 made of a thermoplastic acrylic resin, is not specifically limited in type so far as they have a thermal deformation temperature higher than the acrylic resin preferably by not less than 8° C., more preferably by not less than 15° C. Examples of the matting agent include acrylic, styrene, urethane and silicone agents. When consideration is taken to the affinity for and dispersion in an acrylic resin serving as a matrix resin and also not to impede transparency due to a close refractive index, acrylic crosslinked particles are used as a matting agent in this embodiment.

The acrylic crosslinked particles are obtained by subjecting, to suspension polymerization, a mixture of a non-crosslinking monomer having one polymerizable double bond in the molecule and a crosslinking monomer having two or more polymerizable double bonds as is described in JP-A Sho 56-36535 and are those particles made of a crosslinked polymer having an average particle of 35 to 500 μm, preferably approximately 40 to 200 μm.

The acrylic crosslinked particles are preferably polymethyl methacrylate crosslinked particles containing as a copolymerizable component a hydroxyalkyl acrylate and/or a hydroxyalkyl methacrylate.

Examples of the non-crosslinking monomer include, as a main component, a (meth)acrylic acid ester such as methyl (meth)acrylate, ethyl (meth)acrylate, butyl (meth)acrylate or the like. If necessary, there may be appropriately added an aromatic monomer such as styrene, α-methyl styrene, vinyl toluene or the like, an unsaturated carboxylic acid such as (meth)acrylic acid, maleic acid or the like, or a vinyl ester such as vinyl acetate, vinyl butyrate or the like.

The crosslinking monomers include, for example, an allyl compound such as allyl methacrylate, triallyl cyanurate, triallyl isocyanurate or the like, a polyfunctional (meth) acrylate such as ethylene glycol di(meth)acrylate, propylene glycol di(meth)acrylate, divinyl benzene and the like. The monomer is usually formulated in approximately 0.5 to 5 parts by mass per 100 parts by mass of the non-crosslinking monomer.

Where a resin mainly composed of methyl methacrylate as mentioned above is used as a thermoplastic acrylic resin that is a main component of the matte sheet layer 40, it is preferred to use the acrylic crosslinked particles made mainly of methyl methacrylate in view of the affinity for the both of them and a low difference in refractive index (transparency).

The acrylic crosslinked particles are crosslinked due to the formulation of a crosslinking monomer, so that the thermal deformation temperature becomes higher than that of a substantially non-crosslinked thermoplastic acrylic resin composed mainly of the same monomer. In this regard, however, if it is intended to achieve an adequately high thermal deformation temperature sufficient for the purpose of the present invention by increasing an amount of a crosslinking monomer to increase a crosslinking density, the resulting resin become hard and its affinity for the thermoplastic acrylic resin is lowered. Hence, there may be caused possibility that voids are generated due to interlayer peeling during bending processing and the like with the likelihood of causing whitening and a difference in refractive index with the thermoplastic acrylic resin increases thereby resulting in a feeling of white turbidity.

In order to obtain acrylic crosslinked particles of a satisfactory thermal deformation temperature without causing such problems as described above, it is favorable to substitute part of a non-crosslinking monomer with a hydroxyalkyl (meth)acrylate such as hydroxymethyl), (meth)acrylate, hydroxypropyl (meth)acrylate or the like. The amount is generally approximately 5 to 30 mass % relative to the total amount of non-crosslinking monomers with good results being obtained.

The matte sheet layer 40 has an emboss 4a on the surface thereof. The emboss 4a is formed, for example, by thermal embossing.

As stated above, the incombustible decorative sheet 10 of the present embodiment makes use of the transparent matte sheet layer 40, to which the matting agent made of organic crosslinked particles whose thermal deformation temperature is higher than a thermoplastic acrylic resin serving as a matrix resin. Accordingly, if the sheet is exposed to a high temperature atmosphere in use, a change in matte feeling (rise of gloss) is less likely to occur. Moreover, if an emboss 4a such as, for example, a grain vessel channel, is made on the surface of the transparent matte sheet layer 40, the matting effect of the matting agent does not disappear by application of heat in the course of embossing, so that a good matte feeling can be maintained on the surface. In this way, there can be readily obtained an incombustible decorative sheet which has both a steric design feeling based on the emboss 4a and a poised, high-class design feeling brought about by the matte surface.

Here, reference numeral 30 of FIG. 3 indicates a back surface primer layer. This back surface primer layer 30 may not be provided.

The incombustible decorative sheet of the present embodiment is used after being bonded to (laminated on) the surface of a variety of substrates such as, for example, a wood substrate and an inorganic substrate like conventional incombustible decorative sheets. In general, an appropriate adhesive such as, for example, a urethane or vinyl acetate adhesive is used for the lamination. Although depending on the type of material of the substrate layer 1 (e.g. the case of an olefin resin film), adhesion with such an ordinary lamination adhesive may be unsatisfactory in some cases. In such a case, it is preferred to provide, on the back surface of the substrate 1, a back surface primer layer 30 made of a resin composition that is excellent in adhesion to an ordinary lamination adhesive.

For the back surface lamination primer layer 30, there are known various types of primer agents including, for example, urethane, acrylic, ethyl-vinyl acetate copolymer and vinyl chloride-vinyl acetate copolymer agents, from which an agent is used after proper selection while taking the type of material for the substrate layer 1 into consideration. It will be noted that when powder, for example, of silica, alumina, calcium carbonate, barium sulfate or the like is added to the back surface primer layer 30, the surface of the back surface primer layer 30 is roughened, so that blocking of the incombustible decorative sheet during take-up and storage can be prevented and adhesion to the lamination adhesive can be improved due to an anchoring effect.

It will be noted that where no design pattern layer 2 is provided, it is not needed that the matte sheet layer 40 be transparent.

(Fluorine Resin Layer 5)

The fluorine resin layer 5 is a thermoplastic resin layer and is a sheet-shaped layer made of a fluorine resin. The fluorine resin layer 5 serves to impart surface characteristics such as resistances to acid, alkali, solvent and contamination to the incombustible decorative sheet 10.

The fluorine resin is not specifically limited, and known fluorine resins can be used.

The fluorine resin layer 5 made of a fluorine resin may be formed by coating. In this connection, the fluorine resin layer 5 may be formed by laminating a film of a fluorine resin such as a polyvinyl fluoride resin (PVF), an ethylene-tetrafluoroethylene copolymer (ETFE), polyvinylidene fluoride (PVDF), a tetrafluoroethylene-hexafluoropropylene copolymer (FEP), a tetrafluoroethylene-perfluoroalkyl vinyl ether copolymer (PFA) or the like. Especially, it is preferred to use an ethylene-tetrafluoroethylene copolymer (ETFE) and a tetrafluoroethylene-perfluoroalkyl vinyl ether copolymer (PFA) in view of their excellence in melt molding and contamination resistance.

It will be noted that the fluorine resins used include, for example, polyvinylidene fluoride (PVDF), a tetrafluoroethylene resin (PTFE), a tetrafluoroethylene-perfluoroalkoxy vinyl ether copolymer (PFA), a tetrafluoroethylene-hexafluoropropylene copolymer (FEP), polychlorotrifluoroethylene (PCTFE), a tetrafluoroethylene-ethylene copolymer (ETFE), a chlorotrifluoroethylene-ethylene copolymer (ECTFE), and polyvinyl fluoride (PVF).

Further, when an ultraviolet absorber is used in combination, light fastness and weatherability can be improved (provided that its addition sufficient to color the resin is not favorable). Where a fluorine resin film is used, it is preferred to carry out uneven processing of an uneven pattern such as an emboss after lamination of the fluorine resin layer 5 on the weather-resistant resin layer 4.

For the resin layer made of an ethylene-vinyl alcohol copolymer resin (EVOH), there are known two types of EVOHs having ethylene contents of 82 to 90 mole % and 25 to 50 mole %, respectively. In view of the excellence in solvent resistance, oil resistance, contamination resistance and transparency, EVOH of the type having an ethylene content of 25 to 50 mole % can be preferably used. Moreover, when an ultraviolet absorber is used in combination, light fastness and weatherability can be improved (provided that its addition sufficient to color the resin is not favorable). The uneven processing such as embossing may be performed after lamination on the weather-resistant resin layer 4, or the embossing may be performed for the EVOH at the time of meltruder coating (including an embossing process at the time of co-extrusion lamination of the weather-resistant resin layer 4 and the EVOH resin).

When bending whitening and adhesion with the weather-resistant resin layer 4 are taken into consideration, the use of polyvinylidene fluoride (Tg of PVDF is −39° C.) as a fluorine resin is more preferred. From the standpoint of whitening resistance, a ratio in thickness of the fluorine resin layer 5 to the weather-resistant resin layer 4 is more preferably set at not less than 20% to not larger than 40%. When the incombustible decorative sheet 10 of the embodiment is bent after lamination on the metal substrate 7, the outmost layer (fluorine resin layer 5) is more extended than the inside layer (weather-resistant resin layer 4). Nevertheless, since Tg of the outermost layer (fluorine resin layer 5) is so low that fine cracks causing whitening become unlikely to occur.

It is preferred that a ratio in thickness between the fluorine resin layer 5 and the weather-resistant resin layer 4 is set within a range of 10:90 to 40:60. This leads to improved incombustibility.

The thickness of the fluorine resin layer 5 is preferably approximately 1 μm to 15 μm, more preferably 1 μm to 10 μm.

The total thickness of the two or more thermoplastic resin layers including the weather-resistant resin layer 4 and the fluorine resin layer 5 is preferably designed within a range of 80 μm to 130 μm when processability and incombustibility are taken into consideration.

In this regard, however, when bending whitening property and weatherability are taken into account, it is preferred that the total thickness of the weather-resistant resin layer 4 and the fluorine resin layer 5 is set within a range of 20 μm to 80 μm. More preferably, the total thickness is within a range of 30 μm to 60 μm from the standpoint of bending whitening property and weatherability.

The fluorine resin layer 5 is such that a ratio (thickness of fluorine resin layer 5/thickness of weather-resistant resin layer 4) is preferably from 0.05 to 1.0, more preferably from 0.05 to 0.8, from the viewpoint of the incombustibility and bending processing properties.

The incombustible decorative sheet 10 of the present embodiment is used, for example, as a surface decorative material such as of architectural interiors, partitions, storage furniture, and architectural semi-exteriors, i.e. a front door, a front door frame, a window frame, a bay window counter and the like. This incombustible decorative sheet 10 includes the weather-resistant resin layer 4 formed on the substrate layer 1, on which the fluorine resin 5 is further laminated to provide an incombustible decorative sheet 10 having weatherability, contamination resistance and solvent resistance. Eventually, there can be solved problems involved in conventional laminates of an acrylic resin on a vinyl chloride resin, i.e. a problem in that since resistances to contamination, oil and solvent are low, dirt is liable to be attached and the attached dirt cannot be wiped off with a solvent and a problem in that the vinyl chloride resin is laminated, so that when such an incombustible decorative sheet 10 is discarded and burnt away, there is a risk of generating dioxin, thus involving difficulty in combustion treatment.

That is, the incombustible decorative sheet 10 of the present embodiment has weatherability, contamination resistance and solvent resistance and is improved in a resistance to bending whitening.

The substrate layer 1 is colored and the design pattern layer 2 is formed between the substrate 1 and the weather-resistant resin layer 4.

Preferably, an uneven pattern formed such as by thermal shape-imparting processing from above the weather-resistant resin layer 4 is imparted.

This can provide an excellent incombustible decorative sheet 10 having both designability and a real feel.

Further, it is preferred that the total thickness of the incombustible decorative sheet is not larger than 200 μm and the total thickness of the weather-resistant resin layer 4 and the fluorine resin layer 5 is within a range of from 20 μm to 80 μm.

In doing so, the laminate of the incombustible decorative sheet 10 to a metal sheet selected from aluminum, stainless steel, copper and steel sheets is imparted with incombustibility sufficient to meet the requirements of (1) a total heat value over 20 minutes after commencement of heating being not larger than 8 $MJ/m^2$, (2) a maximum heat release rate not exceeding 200 $KW/m^2$ continuously over 10 seconds for 20 minutes after commencement of heating, and (3) no cracks and voids, which are harmful for fire protection, being found over 20 minutes after commencement of heating in an ignitability test using a cone calorimeter testing machine according to the fire protection and fireproofing test method and the performance evaluation standards based on Paragraph 9 of Article 2 of the Japanese Building Standards Act and Paragraph 2 of Article 108 of the Regulations of the Building Standards Act.

<Metal Decorative Member 20>

As shown in FIG. 1, the metal decorative member 20 is formed by laminating a metal substrate 7 to such an incombustible decorative sheet 10 as stated above by means of an adhesive layer 6.

(Adhesive Layer 6)

The adhesive layer 6 is a sheet-shaped layer made of an adhesive. The adhesive is not specifically limited, and known adhesives can be used. For instance, there can be used thermoplastic resins such as polyamide resins, acrylic resins, vinyl acetate resins and the like, and curing resins such as thermosetting urethane resins. Alternatively, a two-part curing urethane resin or polyester resin using an isocyanate curing agent may also be used.

Still alternatively, a reaction-type hot melt adhesive may also be used as an adhesive of the adhesive layer 6. The reaction-type hot melt adhesive is one that is free of solvent, is molten upon heating, and is solidified by cooling.

Examples of the reaction-type hot melt adhesive include a urethane, reaction-type hot melt adhesive. The urethane, reaction-type hot melt adhesive contains a functional group (isocyanate group) reacting with moisture and reacts, after cooling and solidifying, with moisture attached to the incombustible decorative sheet 10 and the aluminum substrate 7 and passed therethrough to cause polymerization to proceed thereby improving adhesion strength and creep resistance.

Preferably, the mass (mass of solids of the reaction-type hot melt adhesive per unit area) of the reaction-type hot melt adhesive in the adhesive layer 6 is set at not less than 37 $g/m^2$ to not larger than 46 $g/m^2$. This leads to more appropriately improved adhesion strength and creep resistance.

(Metal Substrate 7)

The metal substrate 7 is a plate-shaped member made mainly of a metal. The metal is not specifically limited, and known metals can be used therefor. Examples include aluminum, stainless steel, copper and the like.

Where a reaction-type hot melt adhesive is used as an adhesive of the adhesive layer 6, an aluminum substrate is preferred as the metal substrate 7. The aluminum substrate is a member made of an aluminum alloy. For example, an aluminum mold material and an aluminum plate can be used. The aluminum substrate is preferably formed with an anodized film and an acrylic-melamine thermosetting resin coating film in this order according to surface treatments.

Figure 4:
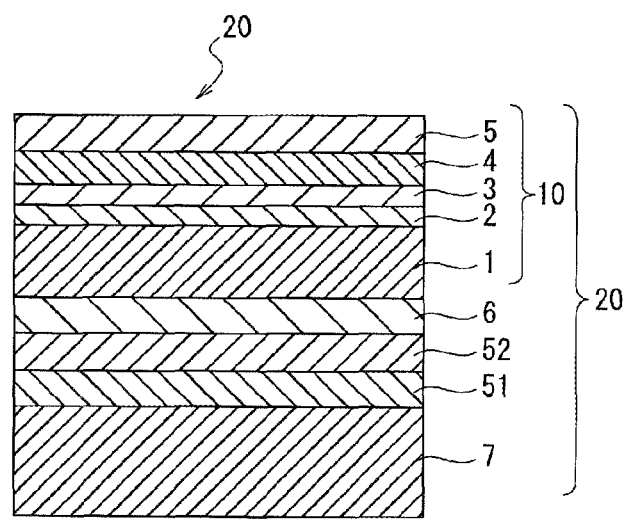
FIG. 4 is a sectional view illustrating an anodized film formed on the surface of a substrate.

As shown in FIG. 4, an anodized film 51 and a coating layer 52 are preferably formed on the surface of the metal substrate 7 by surface treatments.

The formation of the anodized film 51 and the coating layer 52 is described. It will be noted that in the following illustration, the metal substrate 7 is assumed as an aluminum substrate. In addition, an example that the metal decorative member 20 is an aluminum decorative member is illustrated. In this regard, however, any metal that is able to form an anodized film 51 may be conveniently applicable. Examples of the metals susceptible to form an oxide film include Al, Ta, Ti, Mg, Nb, Zn, Zr and the like, of which Al is preferred.

The substrate 7 is subjected to anodization treatment on the surface thereof to form an anodized film 51. Moreover, a coating resin is subjected to baking finishing on the anodized film 51 to form a coating film layer 52.

Examples of the coating film resin include acrylic resins, melamine resins, fluorine resins and the like. The coating film resin may be one obtained by mixing two or more selected from acrylic resins, melamine resins and fluorine resins.

The incombustible decorative sheet 10 is laminated through the adhesive layer 6 on the substrate 7 on which the anodized film 51 and the baking-finished coating layer 52 have been formed.

In this case, a urethane resin adhesive is used as the adhesive layer 6. The solid mass of the urethane resin adhesive is preferably from 15.0 $g/m^2$ to 26.4 $g/m^2$.

The urethane resin adhesive is made, for example, of a two-part urethane resin adhesive using a polyester polyol as a main agent and isophorone diisocyanate as a curing agent.

The thickness of the urethane resin adhesive layer 6 is preferably from 0.5 to 2.5 μm, for example.

Figure 5:
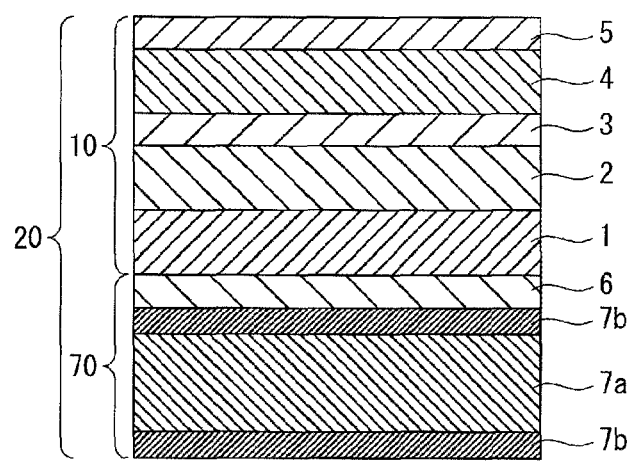
FIG. 5 is a sectional view illustrating a substrate made of a composite panel.

The substrate 7 may be a composite panel 70 as shown in FIG. 5.

The composite panel 70 includes a mixed resin layer 7a serving as a core and a metal substrate 7b laminated on opposite surfaces of the mixed resin layer 7a.

The mixed resin layer 7a is a layer made of a mixed resin containing a polyethylene resin and aluminum hydroxide.

The metal substrate 7b is a plate-shaped member made of a metal. The metal is not specifically limited, and known metals can be used. For example, there can be used aluminum, Galvalume, stainless steel and titanium. Especially, aluminum or Galvalume is preferred in view of weight saving. This enables the composite panel 70, i.e. a member laminated with the incombustible decorative sheet 10, to be made light in weight and high in rigidity.

Where the substrate 7 is made of an aluminum plate, the thickness of the aluminum plate is preferably set at 0.5 mm to 0.8 mm.

(Other Configurations)

The incombustible decorative sheet 10 is imparted with an uneven pattern on the surface thereof. The method of forming the uneven pattern is, for example, thermal embossing. This enables the metal decorative member 20 to be improved in designability.

<Aluminum Decorative Member>

The aluminum decorative member is fabricated by taking an aluminum decorative plate, which is a metal decorative member 20 of the embodiment having the substrate 7 made of an aluminum plate, from a stock place and bending into a desired product shape (steric shape) while heating at least a portion to be bent thereby providing an aluminum decorative member.

The heating temperature (i.e. a temperature of a portion to be bent during bending) is, for example, from 40° C. to 70° C. The heating temperature should be set depending on the type of resin of the incombustible decorative sheet 10. The bending processing may be performed subsequent to heating beforehand. The temperature at the time of bending should be set at the above-indicated heating temperature.

The product shape of the aluminum decorative member is not specifically limited, and the sectional profile of the surface shape is created by bending in a desired form such as a rectangular, circular, and triangular or the like form. It will be noted that it has been confirmed that if the radius R of the bending portion is not less than 1R, bending processing can be performed without problems.

(Effects of the Present Embodiment)

The invention related to the present embodiments has the following effects.

(1) The incombustible decorative sheet 10 related to the present embodiment comprises laminating, on a substrate layer 1, a weather-resistant resin layer 4 and a fluorine resin layer 5 in this order wherein the weather-resistant resin layer is made of a mixture of an acrylic resin and an acrylic resin-based rubber with such a mixing ratio that the acrylic resin is not less than 40 mass % to not larger than 70 mass % and the acrylic resin-based rubber is not less than 30 mass % to not larger than 60 mass %, and a ratio between the fluorine resin layer 5 and the weather-resistant resin layer 4 is within a range of 10:90 to 40:60, thus incombustibility being imparted thereto.

According to this configuration, the weather-resistant resin layer 4 and the fluorine resin layer 5 are stacked on the substrate 1, thus ensuring weatherability, contamination resistance and solvent resistance. Since the acrylic resin of the weather-resistant resin layer 4 is set at not less than 40 mass % to not large than 70 mass % and the acrylic resin-based rubber is set at not less than 30 mass % to not larger than 60 mass %, and the ratio between the thickness of the fluorine resin layer 5 and the thickness of the weather-resistant resin layer 4 is set within a range of 10:90 to 40:60, all of the incombustibility, processability and weatherability can be made good. In this way, there can be provided the incombustible decorative sheet 10 that has weatherability, contamination resistance and solvent resistance and is able to make good all of incombustibility, processability and weatherability.

The weather-resistant resin layer 4 is constituted of a mixture wherein a ratio by mass between the acrylic rubber and the acrylic resin is set at 30:70 to 60:40. When a total heat value and a heat release rate, both relative to time, of the decorative plate obtained by laminating the incombustible decorative sheet 10 and a metal substrate are determined according to the cone calorimeter fire test conforming to ISO 5660-1, incombustibility is ensured to satisfy the requirements that: (i) a total heat value over 20 minutes after commencement of heating be not larger than 8 MJ/m$^2$, (ii) a maximum heat release rate do not exceed 200 KW/m$^2$ continuously over 10 seconds for 20 minutes after commencement of heating, and (iii) there be no cracks and voids, which are harmful for fire protection and pass through to the back surface, over 20 minutes after commencement of heating.

(2) The incombustible decorative sheet 10 related to the present embodiment includes a design pattern 2 and two or more transparent thermoplastic resin layers 4,5 laminated on a substrate layer 1 in this order wherein an outermost layer 5 of the transparent thermoplastic resin layers is made of a fluorine resin, and an inside layer 4 other than the outermost layer 5 of the transparent thermoplastic resin layers is made of a mixture of an acrylic resin and an acrylic resin-based rubber with its mixing ratio being such that an acrylic resin ranges from 40 mass % to 70 mass %, inclusive, and the acrylic resin-based rubber ranges from 30 mass % to 60 mass %, inclusive, a ratio in thickness between the outermost layer 5 of the thermoplastic resin layers and the inside layer 4 is within a range of 10:90 to 40:60, inclusive, the substrate layer 1 is made of a polyolefin resin and has a thickness of from 30 μm to 70 μm, inclusive, and a total thickness of the incombustible decorative sheet 10 is from 80 μm to 130 μm, inclusive, and has thus incombustibility.

According to such a configuration as set out above, the layer (inside layer 4) made of a mixture of an acrylic resin and an acrylic resin-based rubber and the layer (outermost layer 5) made of a fluorine resin are laminated on the substrate layer 1, so that weatherability, contamination resistance, processability and incombustibility are imparted thereto. Since the substrate layer 1 is formed of a polyolefin resin, generation of dioxin at the time of disposal can be prevented. In this way, according to this embodiment, there can be provided the incombustible decorative sheet 10 that has weatherability, contamination resistance, processability and incombustibility and can prevent the generation of dioxin at the time of disposal.

Further, since the inside layer 4 is configured such that the acrylic resin ranges from 40 mass % to 70 mass % and the acrylic resin-based rubber ranges from 30 mass % to 60 mass % and the ratio between the thickness of the outermost layer 5 and the thickness of the inside layer 4 is set within a range of 10:90 to 40:60, incombustibility, processability and weatherability can be all made good.

(3) The incombustible decorative sheet 10 related to this embodiment is such that the fluorine resin for the fluorine resin layer 5 is made of a polyvinylidene fluoride resin, and the substrate layer 1 is made of a colored polypropylene resin colored by mixing of at least any of an organic pigment and an inorganic pigment.

According to this configuration using a polyvinylidene fluoride resin, better bending whitening and adhesion with the inside layer 4 can be ensured.

(4) Since the fluorine resin layer 5 is formed on a surface layer side, the incombustible decorative sheet 10 can be imparted with surface characteristics such as resistances to acid, alkali, solvent and contamination.

(5) The adhesion layer 3 has two layers including an adhesive layer 3a made of a urethane adhesive having a main chain made of a polyester resin and a urethane anchoring agent having a main chain made of an acrylic resin.

A curing agent made of an isocyanate compound contained in the adhesive layer 3a and the anchor layer 3b causes a crosslinking reaction to occur inside the adhesive layer 3a and the anchor layer 3b, so that thermal resistant adhesion between the substrate layer 1 and the weather-resistant resin layer 4 becomes excellent.

The anchor layer 3b serves to protect the adhesive layer 3a.

In view of the above effects, the incombustible decorate sheet 10 and the decorative member of the present embodiment ensures weatherability under outdoor exposure over a long period of time and have good heat resistance and incombustibility.

(6) Where an ultraviolet absorber is added to the anchor layer 3b made of a urethane anchoring agent having a main chain made of an acrylic resin, such an effect is shown as to obtain an incombustible decorative sheet 10 which is improved in UV-shielding capability and is excellent in weatherproof adhesion along with thermal resistant adhesion.

(7) Since the organic solid mass of the constituent polypropylene resin for the substrate 7 is set from 44 g/m$^2$ to 67 g/m$^2$, the incombustibility of the incombustible decorative sheet 10 is improved.

(8) The incombustible decorative sheet 10 of the present embodiment is used, for example, for surface decorative materials of architectural interiors, partitions, storage furniture and the like, and architectural semi-exteriors, i.e. front doors, front door frames and window frames, bay window counters, and the like. This incombustible decorative sheet 10 has the weather-resistant resin layer 4 and also a contamination resistant resin layer made of the fluorine resin layer 5 laminated on the substrate layer 1, thereby providing an incombustible decorative sheet 10 having weatherability, contamination resistance and solvent resistance. Thus, such an effect is shown as to solve a problem in that with the case of a conventional laminate of an acrylic resin on a vinyl chloride resin, resistances to contamination, oil and solvent are so low that dirt is liable to be attached and the attached dirt cannot be wiped away with a solvent and a problem in that the vinyl chloride resin is laminated, so that when such an incombustible decorative sheet 10 is burnt away at the time of disposal, there is a risk of generating dioxin, thus involving difficulty in combustion treatment.

More particularly, the incombustible decorative sheet 10 has weatherability, contamination resistance and solvent resistance and is improved in bending whitening resistance.

The substrate layer 1 is colored and the design pattern layer 2 is formed between the substrate layer 1 and the weather-resistant resin layer 4. An uneven pattern is formed such as by thermal shape-imparting processing from above the weather-resistant resin layer 4.

This enables an excellent incombustible decorative sheet 10 to have both designability and a real feel.

(9) Further, it is preferred that the total thickness of the incombustible decorative sheet 10 is within a range of not larger than 200 μm and the total thickness of the weather-resistant resin layer 4 and the contamination resistant resin layer made of the fluorine resin layer 5 is within a range of not less than 20 μm to not larger than 80 μm.

According to this configuration, the laminate of the incombustible decorative sheet 10 to a metal sheet selected from aluminum, stainless steel, copper and steel sheets is imparted with incombustibility sufficient to meet the requirements of a total heat value over 20 minutes after commencement of heating being not larger than 8 MJ/m$^2$, a maximum heat release rate not exceeding 200 KW/m$^2$ continuously over 10 seconds for 20 minutes after commencement of heating, and no cracks and voids, which are harmful for fire protection, being found over 20 minutes after commencement of heating in an ignitability test using a cone calorimeter testing machine according to the fire protection and fireproofing test method and the Performance Evaluation Standards based on Paragraph 9 of Article 2 of the Japanese Building Standards Act and Paragraph 2 of Article 108 of the Regulations of the Building Standards Act.

(10) The aluminum decorative member has the incombustible decorative sheet 10 laminated on an aluminum substrate 7 through an adhesive layer 6 wherein the adhesive layer 6 is formed of a reaction-type hot melt adhesive.

According to this configuration, the adhesion strength of the adhesive layer 6 and a creep resistance can be improved, so that there can be provided an aluminum decorative member that is excellent in adhesion between the incombustible decorative sheet 10 and the aluminum substrate 7.

(11) The aluminum decorative member related to the present embodiment is such that the mass of the reaction type hot melt adhesive in the adhesive layer 6 ranges from not less than 37 g/m$^2$ to not larger than 46 g/m$^2$.

According to this configuration, the adhesion strength and creep resistance can be more appropriately improved.

(12) With the aluminum decorative member of the present embodiment, the incombustible decorative sheet 10 is formed in such a way the weather-resistant resin layer 4 and the fluorine resin layer 5 are laminated on the substrate layer 1 in this order wherein a mixing ratio is such that the acrylic resin is from 40 mass % to 70 mass % and the acrylic acid-based rubber is from 30 mass % to 60 mass %, and a ratio between the fluorine resin layer 5 and the weather-resistant resin layer 4 is within a range of 10:90 to 40:60 whereby incombustibility is imparted.

According to this configuration, since the weather-resistant resin layer 4 and the fluorine resin layer 5 are laminated on the substrate layer 1, weatherability, contamination resistance and solvent resistance are imparted. Since the weather-resistant resin layer 4 is such that the acrylic resin ranges from 40 mass % to 70 mass % and the acrylic resin-based rubber ranges from 30 mass % to 60 mass % and a ratio between the thickness of the fluorine resin layer 5 and the thickness of the weather-resistant resin layer 4 is within a range of 10:90 to 40:60, incombustibility, processability and weatherability can be all made good. Thus, there can be provided an aluminum decorative member that has weatherability, contamination resistance and solvent resistance and enables incombustibility, processability and weatherability to be made good.

(13) When a coating film resin such as an acrylic resin is formed by baking coating on an anodized film 51 formed on the surface of the substrate 7 of a metal such as aluminum, the coating film layer 52 is improved in adhesion along with improved adhesion between the incombustible decorative sheet 10 and the metal substrate 7. As a result, there can be provided a metal decorative member excellent in durability.

(14) The coating film resin includes any of an acrylic resin, a melamine resin and a fluorine resin, or a mixed resin of two or more.

In this way, the adhesion of the coating film layer 52 can be more reliably improved.

(15) In the case where the incombustible decorative sheet 10 is such that one or two weather-resistant resin layers 4 and a fluorine resin layer 5 are formed on one surface side of a thermoplastic resin substrate layer 1 in this order wherein the weather-resistant resin layers 4 contain an acrylic rubber and acrylic resin with a ratio by mass between the acrylic rubber and the acrylic resin being at 30:70 to 60:40 thereby providing an incombustible decorative sheet 10, there can be provided a metal decorative member including the incombustible decorative sheet 10 which satisfies requirements of incombustibility determined by a cone calorimeter fire test conforming to ISO 5660-1.

(16) The decorative member 20 related to the present embodiment includes an incombustible decorative sheet 10 having a weather-resistant resin layer 4 and a fluorine resin layer 5 laminated on one surface side of a substrate layer 1 in this order; the substrate 1 of the incombustible decorative sheet 10 is laminated, on the other surface side thereof, to a composite panel 70 wherein a mixed resin layer 7a containing a polyethylene resin and aluminum hydroxide is sandwiched between metal substrates 7b; and the weather-resistant resin layer 4 is made of a mixture of an acrylic resin and acrylic resin-based rubber with its mixing ratio being such that the acrylic resin ranges from 40 mass % to 70 mass % and the acrylic resin-based rubber ranges from 30 mass % to 60 mass %, and a ratio in thickness between the fluorine resin layer 5 and the weather-resistant resin layer 4 ranges from 10:90 to 40:60 whereby incombustibility is imparted thereto.

According to this configuration, since the weather-resistant resin layer 4 and the fluorine resin layer 5 are laminated on the substrate layer 1, weatherability, contamination resistance and solvent resistance are imparted thereto. Since the weather-resistant resin layer contains from 40 mass % to 70 mass % of the acrylic resin and from 30 mass % to 60 mass % of the acrylic resin-based rubber and the ratio between the thickness of the fluorine resin layer 5 and the thickness of the weather-resistant resin layer 4 is set within a range of 10:90 to 40:60, incombustibility, processability and weatherability can be all made good. In this way, there can be provided the decorative member 20 that has weatherability, contamination resistance and solvent resistance, and enables all of incombustibility, processability and weatherability to be made good.

Because of the use of the composite panel 70 wherein the mixed resin layer 7a containing a polyethylene resin and aluminum hydroxide are sandwiched between the metal substrates 7b, the resulting member can be made light in weight and high in rigidity.

(17) When the thickness of the substrate layer 1 made of a thermoplastic resin is set at 50 µm to 75 µm, a matte sheet layer 40 is made of thermoplastic acrylic resins including an acrylic rubber and an acrylic resin with its ratio by mass between the acrylic rubber and the acrylic resin being at 30:70 to 60:40, and the matte sheet layer 40 has a thickness of from 20 µm to 55 µm, incombustibility conforming to ISO 5660-1 can be imparted to the incombustible decorative sheet and also to the decorative member.

The incombustibility conforming to ISO 5660-1 means one in which when a total heat value and a heat release rate, both relative to time, of the incombustible decorative plate obtained by laminating the incombustible decorative sheet 10 and a metal substrate selected from aluminum, iron, stainless steel and copper are determined according to a cone calorimeter fire test, such requirements are satisfied that: (i) a total heat value over 20 minutes after commencement of heating be not larger than 8 MJ/m$^2$, (ii) a maximum heat release rate do not exceed 200 KW/m$^2$ continuously over 10 seconds for 20 minutes after commencement of heating, and (iii) there be no cracks and voids, which are harmful for fire protection and pass through to the back surface, over 20 minutes after commencement of heating.

(18) An emboss is formed on the surface of the matte sheet layer 40. The matte agent is made of acrylic crosslinked particles whose thermal deformation temperature (JIS K 7207) is higher than that of the thermoplastic acrylic resin for the matte sheet layer 40, preferably by not lower than 8° C.

This leads to the provision of an incombustible decorative sheet making use of a transparent matte acrylic resin sheet of a high-class feeling, along with transparent feeling, deep feeling and surface matte feeling although the emboss is formed.

As stated above, the incombustible decorative sheet of the present embodiment makes use of the transparent matte sheet layer 40 wherein the matte agent composed of organic crosslinked particles whose thermal deformation temperature is higher than the thermoplastic acrylic resin serving as a matrix resin. Accordingly, when the sheet is exposed to a high temperature atmosphere in use, a variation in matte feeling (rise of gloss) is unlikely to occur. Additionally, when, for example, a grain vessel channel emboss is formed on the surface of the transparent matte sheet layer 40, a good matte feeling can be held on the surface without losing the matte effect of the matte agent by application of heat at the time of embossing processing. Thus, there can be readily obtained an incombustible decorative sheet having both a steric design feeling by embossing and a poised, high-class design feeling by the matte surface.

(19) The incombustible decorative sheet has a fluorine resin layer as an outermost layer thereof. The fluorine resin is preferably a polyvinylidene fluoride resin.

This enables outdoor weatherability to be obtained.

(20) The acrylic crosslinked particles may be methyl methacrylate-containing crosslinked particles which contains as a copolymerizable component a hydroxyalkyl acrylate and/or a hydroxyalkyl methacrylate.

This leads to improved compatibility between the acrylic crosslinked particles and the acrylic resin layer made of an acrylic rubber and an acrylic resin.

As stated above, the incombustible decorative sheet of the present embodiment makes use of the acrylic transparent matte layer 40 wherein the organic crosslinked particles having a high thermal deformation temperature is formulated as a matting agent. As a consequence, there can be shown such remarkable effects that transparency is high and transparent and deep feelings are excellent, and a heat resistance is so high that if the sheet is exposed to a high temperature atmosphere, for example, of not lower than 60° C. or subjected to embossing processing on the surface thereof, the surface gloss is not significantly increased and high-class appearance designability having a poised, matte feeling can be maintained, along with the incombustibility conforming to ISO 5660-1.

(21) The thickness of an aluminum plate is set at 0.5 mm to 0.8 mm. The thickness within this range allows easy bending processing while keeping given strength.

If the thickness is less than 0.5 mm, there is some concern that substrate strength becomes too low to ensure incombustibility. On the other hand, if over 0.8 mm in thickness, there is also concern that a laminated incombustible decorative sheet 10 cannot follow up on bending.

(22) The outermost layer 5 of the transparent thermoplastic resin layer is made of a polyvinylidene fluoride resin.

When the outermost layer 5 is formed of a fluorine resin (polyvinylidene fluoride resin), incombustibility can be improved.

The use of the polyvinylidene fluoride resin as the outermost layer 5 enables the provision of an aluminum decorative plate as a metal decorative member 20 which has good adhesion to an acrylic resin (polymethyl methacrylate resin) of the inside layer 4 and is improved in weatherability, acid resistance, alkali resistance, solvent resistance and contamination resistance.

(23) The inside layer 4 is formed of a mixture of a polymethyl methacrylate resin and a polymethyl methacrylate-based rubber with its mixing ratio being such that the polymethyl methacrylate resin ranges from 40 mass % to 70 mass % and the polymethyl methacrylate resin-based rubber ranges from 30 mass % to 60 mass %. Moreover, the total thickness of the transparent plastic resin layers is set at 20 µm to 80 µm.

This enables a bending whitening resistance to be improved.

More particularly, since the whitening phenomenon at a bent portion can be suppressed, aluminum decorative plates for use as a metal decorative member 20 in a plate-shaped state such as flat plates prior to processing into a steric shape can be stocked, thus leading to the reduction of inventory burden.

(24) The ratio in thickness between the outermost layer 5 and the inside layer 4 of the transparent thermoplastic resin layers is set within a range of 10:90 to 40:60.

This can lead more reliably to the excellence in incombustibility.

For example, there is reliably ensured such incombustibility satisfying the requirements that: (1) a total heat value over 20 minutes after commencement of heating be not larger than 8 MJ/m$^2$, (2) a maximum heat release rate do not exceed 200 KW/m$^2$ continuously over 10 seconds for 20 minutes after commencement of heating, and (3) there be no cracks and voids, which are harmful for fire protection, over 20 minutes after commencement of heating in an ignitability test using a cone calorimeter fire test conforming to ISO 5660-1.

(25) The metal decorative member 20 related to the present embodiment is one wherein an incombustible decorative sheet 10 of the embodiment is laminated to a metal substrate 7.

According to this configuration, there can be provided a metal decorative member which has weatherability, contamination resistance and solvent resistance, and can make good all of incombustibility, processability and weatherability.

(26) The metal decorative member 20 related to the present embodiment has an uneven pattern on the surface of an incombustible decorative sheet. This configuration enables the designability of the metal decorative member 20 to be improved.

(27) The metal decorative member 20 related to the present embodiment is one wherein the incombustible decorative sheet 10 of the embodiment is laminated to a metal plate serving as the substrate 7.

According to this configuration, there can be provided a metal decorative member 20 which has weatherability, contamination resistance and solvent resistance and makes good all of incombustibility, processability and weatherability.

(28) The metal decorative member 20 related to the present embodiment is one wherein the metal substrate 7 is an aluminum plate or a Galvalume plate.

According to this configuration, the metal decorative member 20 can be made light in weight.

(29) The metal decorative member 20 made of an aluminum decorative plate is heated at least a portion to be bent and subjected to bending processing.

When subjected to bending after heating, a laminated incombustible decorative sheet 10 is improved in following-up property relative to bending and is also improved in bending whitening resistance.

In this way, in order to reduce the stock of substrates, a 0.5 to 0.8 mm thick aluminum plate is used in place of an extruded aluminum molding, and is laminated to an incombustible decorative sheet 10 made of a film, followed by forming into a desired shape, thus enabling a variety of shapes. To improve the processability of an acrylic film, a mixture of an acrylic resin and an acrylic resin-based rubber is provided as a constituent material of the acrylic film so as to achieve a good balance between weatherability and processability. When bending processing is subsequently carried out while heating after lamination to an aluminum plate, whitening can be suppressed.

EXAMPLES

Next, examples based on the present invention are illustrated.

First Example

Example 1

In Example 1, a substrate layer 1 was provided using a colored polypropylene resin. The thickness of the substrate layer 1 was set at 70 µm. The substrate layer 1 was subjected to corona discharge treatment on front and back surfaces thereof, respectively. Subsequently, a grain pattern was printed by gravure printing using a urethane printing ink to provide a design pattern layer 2 on the surface of the substrate layer 1. Thereafter, a back surface primer layer was formed on the back surface of the substrate layer 1 by gravure printing using a coating solution for back surface primer layer. The formulation of the coating solution for back surface primer layer was one which was comprised of 100 parts by mass of a two-part curing polyester urethane (wherein a polyester polyol and a polyisocyanate was mixed at a ratio (mass ratio) of 100:5) and 20 parts by mass of a diluent solvent (which was a mixed solvent of ethyl acetate and methyl isobutyl ketone at a ratio (mass ratio) of 1:1). The back surface primer layer had a thickness of 1 µm.

Subsequently, a polyvinylidene fluoride resin and a mixture for the formation of weather-resistant resin layer were melted and extruded by means of a T die to provide a laminate made of a fluorine resin layer 5 and a weather-resistant resin layer 4. The formulation of the mixture for the formation of the weather-resistant resin layer 4 was comprised of 20 parts by mass of an acrylic resin (constituent units: methyl methacrylate, PMMA resin) and 80 parts by mass of an acrylic rubber ("SA-FW 001" (commercial name), manufactured by Kuraray Co., Ltd., methacrylic resin, constituent units: methyl methacrylate, particulate, an average particle size: 100 nm, PMMA resin-based rubber). The weather-resistant resin layer 4 was such that a ratio by mass between the acrylic resin (PMMA resin) and the acrylic resin-based rubber (PMMA resin-based rubber) was set at 40:60. The laminate had a thickness of the fluorine resin layer 5 of 5 µm and a thickness of the weather-resistant resin layer 4 of 45 µm, and thus, the total thickness was at 50 µm with the thickness of the fluorine resin layer 5:the thickness of the weather-resistant resin layer 4=10:90.

Next, a coating solution made of a two-part curing urethane adhesive having a polyester resin as a main chain was coated on the design pattern 2 to form a transparent adhesive layer 3 (dry thickness: 6 µm), followed by laminating the laminate formed above according to a dry lamination process to provide an incombustible decorative sheet 10. Thereafter, a two-part curing urethane adhesive (coating amount of 25 g/m² in dry state) was applied onto the incombustible decorative sheet 10 to form an adhesive layer 6, following by further lamination of a metal substrate 7 through the adhesive layer 6 to obtain a metal decorative plate as a metal decorative member. The metal substrate 7 used was an aluminum plate. The thickness of the metal substrate 7 was at 1 mm.

Example 2

The thickness of the fluorine resin layer 5 was set at 20 µm and the thickness of the weather-resistant resin layer 4 was set at 30 µm, i.e. adjusted such that thickness of fluorine resin layer 5:thickness of weather-resistant resin layer 4=40:60. Except for the above, an incombustible decorative sheet of Example 2 was made in the same manner as in Example 1.

Example 3

The ratio by mass between the acrylic resin and the acrylic resin-based rubber of the weather-resistant resin layer 4 was adjusted to 70:30. Except for the above, an incombustible decorative sheet 10 of Example 3 was made in the same manner as in Example Example 4

The thickness of the fluorine resin layer 5 was set at 20 µm and the thickness of the weather-resistant resin layer 4 was at 30 µm, i.e. adjusted such that thickness of fluorine resin layer 5:thickness of weather-resistant resin layer 4=40:60. Except for this, an incombustible decorative sheet 10 of Example 4 was made in the same manner as in Example 3.

Comparative Example 1

The thickness of the fluorine resin layer 5 was set at 10 µm and the thickness of the weather-resistant resin layer 4 was at 40 µm, i.e. adjusted such that thickness of fluorine resin layer 5:thickness of weather-resistant resin layer 4=20:80. The ratio by mass between the acrylic resin and the acrylic resin-based rubber of the weather-resistant layer 4 was adjusted to 20:80. Except for the above, a decorative sheet of Comparative Example 1 was made in the same manner as in Example 1.

Comparative Example 2

The ratio by mass between the acrylic resin and the acrylic resin-based rubber of the weather-resistant resin layer 4 was adjusted to 80:20. Except for the above, a decorative sheet of Comparative Example 2 was made in the same manner as in Comparative Example 1.

Comparative Example 3

The thickness of the fluorine resin 5 was set at 2 µm and the thickness of the weather-resistant resin layer 4 was at 48 µm, i.e. adjusted such that thickness of fluorine resin layer 5:thickness of weather-resistant resin layer 4=4:96. The ratio by mass of the acrylic resin and the acrylic resin-based rubber of the weather-resistant resin layer 4 was adjusted at 50:50. Except for the above, a decorative sheet of Comparative Example 3 was made in the same manner as in Example 1.

Comparative Example 4

The thickness of the fluorine resin layer 5 was set at 25 µm and the thickness of the weather-resistant resin layer 4 was at 25 µm, i.e. adjusted such that thickness of fluorine resin layer 5:thickness of weather-resistant resin layer 4=50:50. Except for the above, a decorative sheet of Comparative Example 4 was made in the same manner as in Comparative Example 3.

(Judgment on Evaluation)

The decorative sheets of the foregoing examples and comparative examples were subjected to the following evaluations.

(Incombustibility)

The incombustibility was evaluated as follows.

An ignitability test was carried out using a cone calorimeter testing machine conforming to ISOP 5660-1 and according to the fire protection and fireproofing test method and the performance evaluation standards based on Paragraph 9 of Article 2 of the Japanese Building Standards Act and Paragraph 2 of Article 108 of the Regulations of the Building Standards Act. The case that a total heat value (MJ/m²) over 20 minutes after commencement of heating was not larger than 8 MJ/m² and a maximum heat release rate did not exceed 200 KW/m² continuously over 10 seconds for 20 minutes after commencement of heating was evaluated as acceptable "○". In this regard, cracks of a substrate were also assessed in order that it was also made a condition that the substrate was free of cracks or voids.

(Wrapping Appropriateness (Processability))

Wrapping appropriateness, i.e. processability, was assessed as follows.

Wrapping processing (profile processing) was performed. A sheet wherein no sheet peeling due to the stress of an incombustible decorative sheet occurring immediately after wrapping processing was evaluated as acceptable "○".

(Weatherability)

The weatherability was evaluated as follows.

Using a metal weather, weatherability was evaluated as follows.

After an irradiation mode under the following conditions was carried out for 20 hours, a dew condensation mode under the following conditions was performed for 4 hours, which was taken as one cycle (24 hours) and performed over 312 hours.

Illumination mode: illumination intensity of 65 mW/cm² (measured with Unimeter UIT-101, manufactured by Ushio Inc.), BP temperature of 53° C., humidity of 50%, and 20 hours irradiation.

Dew condensation mode: 30° C., 98% and 4 hours (shower spraying for 30 seconds prior to and after the dew condensation mode).

The test was carried out under such conditions as indicated above for 312 hours, after which an appearance was visually confirmed with respect to the degree of its color degradation and the peeling. The case that there was no considerable degree of color change and degradation and the peeling was evaluated as acceptable "◯".

The results of the evaluations are shown in Tables 1 and 2.

between the thickness of the fluorine resin layer 5 and the thickness of the weather-resistant resin layer 4 was within a range of 10:90 to 40:60, similar results as in Examples 1 to 4 were obtained.

It will be noted that as is typically shown in Comparative Example 1, where the acrylic resin is less than 40 mass % (lower limit value) and the acrylic resin-based rubber is larger than 60 mass % (upper limit value), weatherability was judged as unacceptable "x". Moreover, as is typically shown in Comparative Example 2, where the acrylic resin was larger than 70 mass % (upper limit value) and the acrylic

TABLE 1

| | | | Example 1 | | Example 2 | | Example 3 | | Example 4 | |
|---|---|---|---|---|---|---|---|---|---|---|
| | | | Mass ratio (wet %) | Thickness (layer ratio) | Mass ratio (wt %) | Thickness (layer ratio) | Mass ratio (wt %) | Thickness (layer ratio) | Mass ratio (wt %) | Thickness (layer ratio) |
| Decorative sheet | Fluorine resin layer | PVDF resin | | 5 (10) | | 20 (40) | | 5 (10) | | 20 (40) |
| | Weather-resistant resin layer | PMMA resin | 40 | 45 (90) | 40 | 30 (60) | 70 | 45 (90) | 70 | 30 (60) |
| | | PMMA resin-based rubber | 60 | | 60 | | 30 | | 30 | |
| | | Total thickness (μm) | | 50 | | 50 | | 50 | | 50 |
| Metal plate | | Substrate layer | PP resin 70μ | | PP resin 70μ | | PP resin 70μ | | PP resin 70μ | |
| | | Thickness of aluminum plate (mm) | | 1 | | 1 | | 1 | | 1 |
| Results of evaluation | | Incombustibility | | ◯ | | ◯ | | ◯ | | ◯ |
| | | Wrapping appropriateness (processability) | | ◯ | | ◯ | | ◯ | | ◯ |
| | | Weatherability | | ◯ | | ◯ | | ◯ | | ◯ |

TABLE 2

| | | | Comparative Example 1 | | Comparative Example 2 | | Comparative Example 3 | | Comparative Example 4 | |
|---|---|---|---|---|---|---|---|---|---|---|
| | | | Mass ratio (wet %) | Thickness (layer ratio) | Mass ratio (wt %) | Thickness (layer ratio) | Mass ratio (wt %) | Thickness (layer ratio) | Mass ratio (wt %) | Thickness (layer ratio) |
| Decorative sheet | Fluorine resin layer | PVDF resin | | 10 (20) | | 10 (20) | | 2 (4) | | 25 (50) |
| | Weather-resistant resin layer | PMMA resin | 20 | 40 (80) | 80 | 40 (80) | 50 | 48 (96) | 50 | 25 (50) |
| | | PMMA resin-based rubber | 80 | | 20 | | 50 | | 50 | |
| | | Total thickness (μm) | | 50 | | 50 | | 50 | | 50 |
| Metal plate | | Substrate layer | PP resin 70μ | | PP resin 70μ | | PP resin 70μ | | PP resin 70μ | |
| | | Thickness of aluminum plate (mm) | | 1 | | 1 | | 1 | | 1 |
| Results of evaluation | | Incombustibility | | ◯ | | ◯ | | x | | ◯ |
| | | Wrapping appropriateness (processability) | | ◯ | | x | | ◯ | | x |
| | | Weatherability | | x | | ◯ | | ◯ | | ◯ |

From Tables 1 and 2, it will be seen that as is typically shown in Examples 1 to 4, where the ranges of the invention are satisfied in such a way that the acrylic resin ranges from 40 mass % to 70 mass % and the acrylic resin-based rubber ranges from 30 mass % to 60 mass % and that the ratio between the thickness of the fluorine resin layer 5 and the thickness of the weather-resistant resin layer 4 is within a range of from 10:90 to 40:60, all of the incombustibility, processability and weatherability are good. When Example 1 was carried out by adjusting within the ranges of the invention in such a way that the acrylic resin ranged from 40 mass % to 70 mass % and the acrylic resin-based rubber ranged from 30 mass % to 60 mass % and that the ratio resin-based rubber was larger than 30 mass % (lower limit value), processability was judged as unacceptable "x". In contrast, as is typified by Examples 1 to 4, where the acrylic resin in the weather-resistant resin layer 4 was from 40 mass % to 70 mass % and the acrylic resin-based rubber was from 30 mass % to 60 mass %, weatherability and processability could be all made good.

As is typified by Comparative Example 3, where the ratio between the fluorine resin layer 5 and the weather-resistant resin layer 4 was outside the range of 10:90 to 40:60 (4:96), incombustibility was judged as unacceptable "x". As is typified by Comparative Example 4, where the ratio between the fluorine resin layer 5 and the weather-resistant resin layer 4 was outside the range of 10:90 to 40:60 (50:50), incombustibility was judged as unacceptable "x". In contrast, as is typified by Examples 1 to 4, where the ratio between the fluorine resin layer 5 and the weather-resistant resin layer 4 were within a range of 10:90 to 40:60, incombustibility and processability could be both made good.

Second Example

Example 1

In Example 1, a substrate layer 1 was provided using a colored polypropylene resin as a polyolefin resin. The substrate layer 1 had a thickness of 70 μm. The substrate layer 1 was subjected to corona discharge treatment on front and back surfaces thereof, respectively. A grain pattern was subsequently printed by gravure printing using a urethane printing ink to provide a design pattern layer 2 on the surface of the substrate layer 1. Thereafter, a back surface primer layer was formed on the back surface of the substrate layer 1 by gravure printing using a coating solution for back surface primer layer. The formulation of the coating solution for back surface primer layer was one which was comprised of 100 parts by mass of a two-part curing polyester urethane (wherein a polyester polyol and a polyisocyanate was mixed at a ratio (mass ratio) of 100:5) and 20 parts by mass of a diluent solvent (which was a mixed solvent of ethyl acetate and methyl isobutyl ketone at a ratio (mass ratio) of 1:1). The back surface primer layer had a thickness of 1 μm.

Subsequently, a polyvinylidene fluoride resin and a mixture for the formation of inside layer were melted and extruded by means of a T die to provide a laminate made of an outermost layer 5 and an inside layer 4. The formulation of the mixture for the formation of the inside layer was comprised of 20 parts by mass of an acrylic resin (constituent units: methyl methacrylate, PMMA resin) and 80 parts by mass of an acrylic rubber ("SA-FW 001" (commercial name), manufactured by Kuraray Co., Ltd., methacrylic resin, constituent units: methyl methacrylate, particulate, an average particle size: 100 nm, PMMA resin-based rubber). The inside layer 4 had a ratio by mass between the acrylic resin (PMMA resin) and the acrylic resin-based rubber (PMMA resin-based rubber) set at 40:60. The laminate had a thickness of the outermost layer 5 of 5 μm and a thickness of the inside layer 4 of 45 μm, and thus the total thickness was at 50 μm with the thickness of the outermost layer 5:the thickness of the inside layer 4=10:90. The total thickness of the incombustible decorative sheet 10 was set at 120 μm.

Next, a heat sealing agent (acrylic resin:polyester resin: vinyl chloride acetate=1:1:1, formulated with an isocyanate curing agent) was coated onto the design pattern 2 to form a transparent adhesive layer 3 (dry thickness: 1 μm), on which the laminate formed above was placed, followed by thermal lamination under conditions of a film surface temperature of 120° C. Moreover, a grain vessel channel pattern was embossed on the laminate under conditions of a sheet surface temperature of 120° C. thereby providing an incombustible decorative sheet 10. Thereafter, a two-part curing urethane adhesive (coating amount of 25 g/m² in dry state) was applied onto the incombustible decorative sheet 10 to form an adhesive layer 6, followed by further lamination of a metal plate serving as a metal substrate 7 through the adhesive layer 6 to obtain a metal decorative member. The metal plate used was an aluminum plate. The thickness of the metal plate was set at 1 mm.

Example 2

The thickness of the outermost layer 5 was set at 20 μm and the thickness of the inside layer 4 was at 30 μm, i.e. adjusted such that thickness of outermost layer 5:thickness of inside layer 4=40:60. Except for this, an incombustible decorative sheet 10 of Example 2 was made in the same manner as in Example 1.

Example 3

The ratio by mass between the acrylic resin and an acrylic resin-based rubber of the inside layer 4 was adjusted to 70:30. Except for this, an incombustible decorative sheet 10 of Example 3 was made in the same manner as in Example 1.

Example 4

The thickness of the outermost layer 5 was set at 20 μm and the thickness of the inside layer 4 was at 30 μm, i.e. adjusted such that thickness of outermost layer 5:thickness of inside layer 4=40:60. Except for this, an incombustible decorative sheet of Example 4 was made in the same manner as in Example 3.

The thickness of the substrate layer 1 was adjusted to 30 μm. Except for this, an incombustible decorative sheet 10 of Example 4 was made in the same manner as in Example 1.

Comparative Example 1

The thickness of the substrate layer 1 was adjusted to 90 μm. Except for this, a decorative sheet of Comparative Example 1 was made in the same manner as in Example 1.

Comparative Example 2

The thickness of the substrate layer 1 was adjusted to 20 μm. Except for this, a decorative sheet of Comparative Example 2 was made in the same manner as in Example 1.

Comparative Example 3

The substrate layer 1 was formed of a colored polyethylene resin. Except for this, a decorative sheet of Comparative Example 3 was made in the same manner as in Example 1.

Comparative Example 4

The thickness of the outermost layer 5 was set at 10 μm and the thickness of the inside layer 4 was at 40 μm, i.e. adjusted such that thickness of outermost layer 5:thickness of inside layer 4=20:80. Additionally, a ratio by mass of the acrylic resin and acrylic resin-based rubber of the inside layer 4 was adjusted to 20:80. Except for the above, a decorative sheet of Comparative Example 4 was made in the same manner as in Example 1.

Comparative Example 5

The ratio by mass of the acrylic resin and the acrylic resin-based rubber of the inside layer 4 was adjusted to 80:20. Except for this, a decorative sheet of Comparative Example 5 was made in the same manner as in Comparative Example 4.

Comparative Example 6

The thickness of the outermost layer 5 was set at 2 μm and the thickness of the inside layer 4 was at 48 μm, i.e. adjusted such that thickness of outermost layer 5:thickness of inside layer 4=4:96. The ratio by mass of the acrylic resin and the acrylic resin-based rubber of the inside layer 4 was adjusted to 50:50. Except for the above, a decorative sheet of Comparative Example 6 was made in the same manner as in Example 1.

Comparative Example 7

The thickness of the outermost layer 5 was set at 25 μm and the thickness of the inside layer 4 was at 25 μm, i.e. adjusted such that thickness of outermost layer 5:thickness of inside layer 4=50:50. Except for the above, a decorative sheet of Comparative Example 7 was made in the same manner as in Comparative Example 6.

(Judgment on Evaluation)

The decorative sheets of the foregoing examples and comparative examples were subjected to the following evaluations.

(Incombustibility)

The incombustibility was evaluated as follows.

An ignitability test was carried out using a cone calorimeter testing machine conforming to ISOP 5660-1 and according to the fire protection and fireproofing test method and the performance evaluation standards based on Paragraph 9 of Article 2 of the Japanese Building Standards Act and Paragraph 2 of Article 108 of the Regulations of the Building Standards Act. The case that a total heat value ($MJ/m^2$) over 20 minutes after commencement of heating was not larger than 8 $MJ/m^2$ and a maximum heat release rate did not exceed 200 $KW/m^2$ continuously over 10 seconds for 20 minutes after commencement of heating, such a sheet was evaluated as acceptable "○". In this regard, cracks of a substrate were also assessed in order that it was also made a condition that the substrate was free of cracks or voids.

(Wrapping Appropriateness (Processability))

Wrapping appropriateness, or processability was assessed as follows.

Wrapping processing (profile processing) was performed. A sheet wherein no sheet peeling due to the stress of an incombustible decorative sheet 10 occurring immediately after wrapping processing was evaluated as acceptable "○".

(Weatherability)

The weatherability was evaluated as follows.

Using a metal weather, weatherability was evaluated as follows.

After an irradiation mode under the following conditions was carried out for 20 hours, a dew condensation mode under the following conditions was performed for 4 hours, which was taken as one cycle (24 hours) and performed over 312 hours.

Illumination mode: illumination intensity of 65 $mW/cm^2$ (measured with UIT-101, manufactured by Ushio Inc.), BP temperature of 53° C., humidity of 50%, and 20 hours irradiation.

Dew condensation mode: 30° C., 98% and 4 hours (shower spraying for 30 seconds prior to and after the dew condensation mode).

The test was carried out under such conditions as indicated above for 312 hours, after which an appearance was visually confirmed with respect to the degree of color degradation and the peeling. The case that there was no considerable degree of color change and degradation or peeling was evaluated as acceptable "○".

The results of the evaluations are shown in Tables 3 to 5.

TABLE 3

| | | | Example 1 | | Example 2 | | Example 3 | | Example 4 | |
|---|---|---|---|---|---|---|---|---|---|---|
| | | | Mass ratio (wet %) | Thickness (layer ratio) | Mass ratio (wt %) | Thickness (layer ratio) | Mass ratio (wt %) | Thickness (layer ratio) | Mass ratio (wt %) | Thickness (layer ratio) |
| Decorative sheet | Outermost layer | PVDF resin | | 5 (10) | | 20 (40) | | 5 (10) | | 20 (40) |
| | Inside layer | PMMA resin | 40 | 45 (90) | 40 | 30 (60) | 70 | 45 (90) | 70 | 30 (60) |
| | | PMMA resin-based | 60 | | 60 | | 30 | | 30 | |
| | | Total thickness (μm) | | 50 | | 50 | | 50 | | 50 | |
| | | Substrate layer | PP resin 70μ | | PP resin 70μ | | PP resin 70μ | | PP resin 70μ | |
| | | Total thickness of decorative sheet (μm) | | 120 | | 120 | | 120 | | 120 |
| Metal plate | | Thickness of aluminum plate (mm) | | 1 | | 1 | | 1 | | 1 |
| Results of evaluation | | Incombustibility | | ○ | | ○ | | ○ | | ○ |
| | | Wrapping appropriateness (processability) | | ○ | | ○ | | ○ | | ○ |
| | | Weatherability | | ○ | | ○ | | ○ | | ○ |

TABLE 4

| | | | Example 5 | | Comparative Example 1 | | Comparative Example 2 | | Comparative Example 3 | |
|---|---|---|---|---|---|---|---|---|---|---|
| | | | Mass ratio (wet %) | Thickness (layer ratio) | Mass ratio (wt %) | Thickness (layer ratio) | Mass ratio (wt %) | Thickness (layer ratio) | Mass ratio (wt %) | Thickness (layer ratio) |
| Decorative sheet | Outermost layer | PVDF resin | | 5 (10) | | 5 (10) | | 5 (10) | | 5 (10) |
| | Inside layer | PMMA resin | 40 | 45 (90) | 40 | 45 (90) | 40 | 45 (90) | 40 | 45 (90) |
| | | PMMA resin-based rubber | 60 | | 60 | | 60 | | 60 | |

TABLE 4-continued

|  |  | Example 5 | | Comparative Example 1 | | Comparative Example 2 | | Comparative Example 3 | |
|---|---|---|---|---|---|---|---|---|---|
|  |  | Mass ratio (wet %) | Thickness (layer ratio) | Mass ratio (wt %) | Thickness (layer ratio) | Mass ratio (wt %) | Thickness (layer ratio) | Mass ratio (wt %) | Thickness (layer ratio) |
|  | Total thickness (μm) | 50 | | 50 | | 50 | | 50 | |
|  | Substrate layer | PP resin 30μ | | PP resin 90μ | | PP resin 20μ | | PP resin 70μ | |
|  | Total thickness of decorative sheet (μm) | 80 | | 140 | | 70 | | 120 | |
| Metal plate | Thickness of aluminum plate (mm) | 1 | | 1 | | 1 | | 1 | |
| Results of evaluation | Incombustibility | ○ | | x | | ○ | | ○ | |
|  | Wrapping appropriateness (processability) | ○ | | ○ | | x | | x | |
|  | Weatherability | ○ | | ○ | | ○ | | ○ | |

TABLE 5

|  |  |  | Comparative Example 4 | | Comparative Example 5 | | Comparative Example 6 | | Comparative Example 7 | |
|---|---|---|---|---|---|---|---|---|---|---|
|  |  |  | Mass ratio (wet %) | Thickness (layer ratio) | Mass ratio (wt %) | Thickness (layer ratio) | Mass ratio (wt %) | Thickness (layer ratio) | Mass ratio (wt %) | Thickness (layer ratio) |
| Decorative sheet | Outermost layer | PVDF resin | | 10 (20) | | 10 (20) | | 2 (4) | | 25 (50) |
|  | Inside layer | PMMA resin | 20 | 40 (80) | 80 | 40 (80) | 50 | 48 (96) | 50 | 25 (50) |
|  |  | PMMA resin-based rubber | 80 | | 20 | | 50 | | 50 | |
|  |  | Total thickness (μm) | 50 | | 50 | | 50 | | 50 | |
|  | Substrate layer |  | PP resin 70μ | | PP resin 70μ | | PP resin 70μ | | PP resin 70μ | |
|  | Total thickness of decorative sheet (μm) |  | 120 | | 120 | | 120 | | 120 | |
| Metal plate | Thickness of aluminum plate (mm) |  | 1 | | 1 | | 1 | | 1 | |
| Results of evaluation | Incombustibility |  | ○ | | ○ | | x | | ○ | |
|  | Wrapping appropriateness (processability) |  | ○ | | x | | ○ | | x | |
|  | Weatherability |  | x | | ○ | | ○ | | ○ | |

As is typified by Examples 1 to 5, Tables 3 to 5 reveal that where the ranges of the invention are satisfied in such a way that: the acrylic resin ranges from 40 mass % to 70 mass % and the acrylic resin-based rubber ranges from 30 mass % to 60 mass %; the ratio between the thickness of the outermost layer 5 and the thickness of the inside layer 4 is within a range of 10:90 to 40:60; and the thickness of the substrate layer 1 is from 30 μm to 70 μm and the total thickness of the incombustible decorative sheet 10 is from 80 μm to 130 μm, the incombustibility, wrapping appropriateness (processability) and weatherability are all good. When Example 1 was carried out while adjusting within the ranges of the invention such that the acrylic resin ranged from 40 mass % to 70 mass % and the acrylic resin-based rubber ranged from 30 mass % to 60 mass %, the ratio between the thickness of the fluorine resin layer 5 and the thickness of the weather-resistant resin layer 4 was within a range of 10:90 to 40:60, the thickness of the substrate layer 1 was from 30 μm to 70 μm, and the total thickness of the incombustible decorative layer was from 80 μm to 130 μm, similar results as in Examples 1 to 5 were obtained.

It will be noted that where the thickness of the substrate layer 1 is larger than 70 μm (upper limit value) and the total thickness of the incombustible decorative sheet is larger than 140 μm (upper limit value) as is typified by Comparative Example 1, the incombustibility was evaluated as unacceptable "x". As typified by Comparative Example 2, where the thickness of the substrate layer 1 is smaller than 30 μm (lower limit value) and the total thickness of the incombustible decorative sheet 10 is less than 70 μm (lower limit value), wrapping appropriateness (processability) was judged to be unacceptable "x". Moreover, as is typically shown in Comparative Example 3, when the thickness of the substrate layer 1 was less than 30 μm (lower limit value) and the total thickness of the incombustible decorative sheet is less than 70 μm (lower limit value), the wrapping appropriateness (processability) was judged to be unacceptable "x".

As is typically shown in Comparative Example 4, where the acrylic resin is less than 40 mass % (lower limit value) and the acrylic resin-based rubber is larger than 60 mass % (upper limit value), the weatherability was judged as unacceptable "□". Moreover, As is typically shown in Comparative Example 5, the acrylic resin is larger than 70 mass % (upper limit value) and the acrylic resin-based rubber is less than 30 mass % (lower limit value), the processability was judged as unacceptable "x". As is typically shown in Comparative Example 6, where the ratio in thickness between the outermost layer 5 and the inside layer 4 is outside the range of 10:90 to 40:60, i.e. (4:96), the incombustibility was judged as unacceptable "x". As is typically shown in Comparative Example 7, the ratio in thickness between the outermost layer 5 and the inside layer 4 is outside the range of 10:90 to 40:60, i.e. (50:50), the processability was judged as unacceptable "x".

Third Example

Example 1

A resin sheet (thickness: 70 μm), which was made of a colored polypropylene resin and had a total mass of organic solids of 60.4 g/m², was provided as a substrate layer 1.

The substrate layer 1 was subjected to corona discharge treatment on front and back surfaces thereof, followed by forming a grain pattern on the surface by gravure printing using a urethane printing ink to obtain a design pattern layer (thickness: 2 μm).

On the other hand, a back surface primer layer (thickness: 1 μm) was formed on the back surface of the substrate layer 1 by gravure printing using a coating solution for back surface primer layer having the following formulation.

Next, a polyvinylidene fluoride resin (fluorine resin) and a mixture for the formation of acrylic resin layer were melted and extruded by a T die to form a laminate made of a fluorine resin layer 5 and a weather-resistant resin layer 4 (thickness of fluorine resin layer 5: 5 μm and thickness of weather-resistant resin layer 4: 45 μm).

Further, a urethane-based anchor layer 3b (thickness: 1.5 μm) containing a triazine ultraviolet absorber (5 parts by mass) and made of an acrylic resin as a main chain was formed on the acrylic resin side of the laminate according to gravure printing (hereinafter referred to as "laminate A").

A coating solution made of a two-part curing urethane adhesive made of a polyester resin as a main chain was coated onto the design pattern layer to form an adhesive layer 3a (dry thickness: 6 μm), on which the laminate A was stacked by a dry lamination method to obtain an incombustible decorative sheet 10.

(Coating Solution for Back Surface Primer Layer)

The coating solution for back surface primer layer was indicated below.

Two-part curing polyester urethane (a mixture of a polyester polyol and a polyisocyanate at a ratio (mass ratio) of 100:5): 100 parts by mass Diluent solvent (a mixed solvent obtained by mixing ethyl acetate and methyl isobutyl ketone at a ratio (mass ratio) of 1:1): 20 parts by mass (Mixture for the Formation of Acrylic Resin Layer)

The formulation of the mixture for the formation of the acrylic resin layer is indicated below.

Acrylic resin (constituent units: methyl methacrylate): 45 parts by mass

Acrylic rubber ("SA-FW 001" (commercial name), manufactured by Kuraray Co., Ltd., methacrylic resin, constituent units: methyl methacrylate, particulate, an average particle size: 100 nm): 55 parts by mass

Comparative Example 1

A decorative sheet was obtained in the same manner as in Example 1 except that the total mass of the organic solids of the resin sheet made of the colored polypropylene resin was set a 77.6 g/m² (thickness: 90 μm).

Comparative Example 2

A decorative sheet was obtained in the same manner as in Example 1 except that the total mass of the organic solids of the resin sheet made of the colored polypropylene resin was set a 40.0 g/m² (thickness: 50 μm).

Comparative Example 3

A decorative sheet was obtained in the same manner as in Example 1 except that the urethane-based anchor layer 3b was formed without addition of an ultraviolet absorber to the urethane-based anchor layer 3b.

Comparative Example 4

A decorative sheet was obtained in the same manner as in Example 1 except that the urethane-based anchor layer 3b was not formed.

Comparative Example 5

A decorative sheet was obtained in the same manner as in Example 1 except that the urethane adhesive was not formed.

Comparative Example 6

A resin sheet made of a colored polypropylene resin (thickness: 70 μm) was provided as a substrate layer.

The substrate layer was subjected to corona discharge treatment on front and back surfaces thereof, followed by forming a grain pattern on the surface by gravure printing using a urethane printing ink to obtain a design pattern layer (thickness: 2 μm).

On the other hand, a back surface primer layer (thickness: 1 μm) was formed on the back surface of the substrate layer by gravure printing using a coating solution for back surface primer layer having the following formulation.

Next, a polyvinylidene fluoride resin (fluorine resin) and a mixture for the formation of acrylic resin layer were melted and extruded by a T die to form a laminate made of a fluorine resin layer and a weather-resistant resin layer (thickness of fluorine resin layer 5: 5 μm and thickness of weather-resistant resin layer 4: 45 μm) (hereinafter referred to as "laminate B").

A one-component coating solution made of an acrylic-vinyl chloride-polyester resin was coated onto the design pattern layer to form an adhesive layer (dry thickness: 1.5 μm), on which the laminate B was stacked by a thermal lamination method to obtain a decorative sheet.

(Coating Solution for Back Surface Primer Layer)

The coating solution for back surface primer layer used was as follows.

Two-part curing polyester urethane (a mixture of a polyester polyol and a polyisocyanate at a ratio (mass ratio) of 100:5): 100 parts by mass Diluent solvent (a mixed solvent of ethyl acetate and methyl isobutyl ketone at a ratio (mass ratio) of 1:1): 20 parts by mass (Mixture for the Formation of Acrylic Resin Layer)

The mixture for the formation of acrylic resin layer used was as follows.

Acrylic resin (constituent units: methyl methacrylate): 45 parts by mass

Acrylic rubber ("SA-FW 001" (commercial name), manufactured by Kuraray Co., Ltd., methacrylic resin, constituent units: methyl methacrylate, particulate, an average particle size: 100 nm): 55 parts by mass <Judgment-On-Evaluation Method>

The examples and comparative examples were evaluated and judged in the following way.

(Evaluation of Incombustibility)

The case that a total heat value (MJ/m²) over 20 minutes after commencement of heating conforming to ISO 5660-1 is not larger than 8 MJ/m² and a maximum heat release rate does not exceed 200 KW/m² continuously over 10 seconds for 20 minutes after commencement of the heating was judged as acceptable "○". In this regard, cracks of a substrate were also assessed in order that it was also made a condition that the substrate 7 was free of cracks or voids.

(Water- and Heat-Resistant Adhesion)

A sheet was immersed in hot water of 80° C. for 48 hours and cross-cut on the surface thereof, against which a cellotape (registered trademark) was pressed firmly. Thereafter, it was peeled off vigorously to confirm the presence or absence of peeling.

(Weather-Resistant Adhesion)

Using a metal weather, the water-resistant adhesion was evaluated in the following way.

A sheet was subjected to irradiation over 20 hours according to an irradiation mode of the following conditions and also to a dew condensation mode of the following conditions carried out in a dew condensation condition over 4 hours, which was taken as one cycle and performed over 1512 hours. Thereafter, the resulting surface was cross-cut, against which a cellotape (registered trademark) was pressed firmly. Thereafter, the cellotape was peeled off vigorously to confirm the presence or absence of peeling.

Irradiation mode: illumination intensity of 65 mW/cm$^2$ (measured with Unimeter UIT-101, manufactured by Ushio Inc.), BP temperature of 53° C., humidity of 50% and irradiation over 20 hours.

Dew condensation mode: 30° C., 98%, 4 hours, shower spraying for 30 seconds prior to and after the dew condensation mode.

<Weather-Resistant Color Degradation>

Using the above metal weather, the cycles were carried out over 1512 hours under the same conditions as indicated above, and an appearance was visually confirmed with respect to the degree of color degradation and the peeling.

The case of absence of a considerable degree of color change and degradation and the peeling was judged as acceptable.

The results of the evaluations are shown in Table 6.

TABLE 6

| | Example 1 | Comparative Example 1 | Comparative Example 2 | Comparative Example 3 | Comparative Example 4 | Comparative Example 5 | Comparative Example 6 |
|---|---|---|---|---|---|---|---|
| Fluorine resin layer thickness (μm) | 5 | 5 | 5 | 5 | 5 | 5 | 5 |
| Acrylic resin layer thickness (μm) | 45 | 45 | 45 | 45 | 45 | 45 | 45 |
| Urethane adhesive layer | yes | yes | yes | yes | yes | no | yes |
| Coating amount (g/m²) | 6.5 | 6.5 | 6.5 | 6.5 | 6.5 | | 1.5 |
| Urethane-based anchor layer | yes | yes | yes | yes | no | yes | |
| Coating amount (g/m²) | 1.5 | 1.5 | 1.5 | 1.5 | | 1.5 | |
| UV absorber | yes | yes | yes | no | | | |
| (Decorative sheet lamination method) | lamination possible dry lamination | lamination possible dry lamination | much wrinkled on lamination dry lamination | lamination possible dry lamination | lamination possible dry lamination | lamination impossible dry lamination | lamination possible thermal lamination |
| Substrate | PP-based print sheet | PP-based print sheet | PP-based print sheet | PP-based print sheet | PP-based print sheet | PP-based print sheet | PP resin print sheet |
| Total weight of organic solids (g/m²) | 60.4 | 77.6 | 40 | 60.4 | 60.4 | 60.4 | 60.4 |
| Wrapping adhesive layer | yes | yes | | yes | yes | | yes |
| Metal substrate | aluminum alloy plate | aluminum alloy plate | | | | | aluminum alloy plate |
| Evaluation of acceptance for incombustibility | ○ | x | | ○ | ○ | | ○ |
| Water- and heat-resistant adhesion (cellotape test) Immersion in hot water of 80° C. for 48 hours | acceptable | acceptable | | acceptable | acceptable | | unacceptable |
| | adhesion ○ | adhesion ○ | | adhesion ○ | adhesion ○ | | adhesion x |
| Weather-resistant adhesion (cellotape test) | acceptable | acceptable | | acceptable | unacceptable | | acceptable |
| Metal weather over 1500 hours | adhesion ○ | adhesion ○ | | adhesion ○ | peeled x | | adhesion ○ |
| Weather-resistant color degradation | acceptable | acceptable | | unacceptable | unacceptable | | unacceptable |
| Metal weather over 1512 hours | no considerable discoloration ○ | no considerable discoloration ○ | | discoloration x | peeling x | | peeling x |

As will be seen from Table 6, when the mass ratio between the acrylic rubber and the acrylic resin in the weather-resistant resin layer 4 is set at 30:70 to 60:40, the incombustibility becomes good. Moreover, it will also be seen that the use of the propylene resin as the substrate 7 ensures good incombustibility when the weight of organic solids is set at not less than 44 g/m² to not larger than 67 g/m².

If has been confirmed that when the weight of organic solids of the polypropylene resin constituting the substrate 7 was set at 44 g/m² and 67 g/m², respectively, the same evaluations as in Example 1 were obtained.

It has been found that when the adhesion layer 3 is formed of an adhesive layer 3 and an anchor layer 3b based on the invention and an ultraviolet absorber is added to the anchor layer 3b, and the substrate layer 7 is made of a polypropylene resin with the weight of organic solids being set at 44 g/m² to 67 g/m², the water- and heat-resistant adhesion, weather-resistant adhesion and weather-resistant color degradation are all good.

On the other hand, with the case of Comparative Example 3 wherein no ultraviolet absorber is added to the urethane-based anchor layer 3b, the weather-resistant color degradation is evaluated as unacceptable.

With the case of Comparative Example 4 wherein no urethane-based anchor layer 3b was formed as the adhesion layer 3, weather-resistant adhesion and weather-resistant color degradation are evaluated as unacceptable.

Fourth Example

Example 1

(Incombustible Decorative Sheet 10)

A resin sheet made of a colored polypropylene resin having a thickness of 70 μm was provided as a substrate layer 1. The substrate layer 1 was subjected to corona discharge treatment on front and back surfaces thereof, followed by forming a grain pattern on the surface by gravure printing using a urethane printing ink to obtain a design pattern layer 2 (thickness: 2 μm).

On the other hand, a back surface primer layer (thickness: 1 μm) was formed on the back surface of the substrate layer 1 by gravure printing using a coating solution for back surface primer layer having the following formulation.

Next, a polyvinylidene fluoride resin (fluorine resin) and a mixture for the formation of a weather-resistant resin layer were melted and extruded by a T die to form a laminate (thickness of fluorine resin layer 5: 5 μm, thickness of weather-resistant resin layer 4: 15 μm, total thickness: 20 μm), which was made of a fluorine resin layer 5 and a weather-resistant resin layer 4 having a mass ratio between a PMMA resin and a PMMA resin-based rubber of 40:60 (to which 0.5 wt % of Tinubin 326 of a benzotriazole ultraviolet absorber was added).

Further, a coating solution made of a two-part curing urethane adhesive having a polyester resin as a main chain was coated onto the design pattern 2 to form an adhesive layer (dry thickness: 6 μm), on which the laminate was stacked according to a dry lamination method to obtain an incombustible decorative sheet 10.

(Coating Solution for Back Surface Primer Layer)

The formulation of the coating solution for back surface primer layer was indicated below.

Two-part curing polyester urethane (mixed at a ratio (mass ratio) of a polyester polyol and a polyisocyanate at 100:5): 100 parts by mass Diluent solvent (mixed solvent obtained by mixing at a ratio (mass ratio) of ethyl acetate and methyl isobutyl ketone at 1:1): 20 parts by mass (Mixture for the Formation of the Weather-Resistant Resin Layer)

The formulation of the mixture for the formation of the weather-resistant resin layer is as follows.

Acrylic resin (constituent units: methyl methacrylate): 20 parts by mass

Acrylic rubber ("SA-FW 001" (commercial name), manufactured by Kuraray Co., Ltd., methacrylic resin, constituent units: methyl methacrylate, particulate, an average particle size: 100 nm): 80 parts by mass (Metal Decorative Member)

The incombustible decorative sheet 10 was laminated on a 1 mm thick aluminum plate through a two-part curing urethane adhesive (dry coating amount: 25 g/m²) to make a metal decorative member 20.

Example 2

A metal decorative member 20 was obtained in the same manner as in Example 1 except that the fluorine resin layer 5 was changed to a layer of an ethylene/vinyl alcohol resin.

Example 3

A metal decorative member 20 was obtained in the same manner as in Example 1 except that the mass ratio between the PMMA resin and the PMMA resin-based rubber of the weather-resistant resin layer 4 was set at 70:30.

Example 4

A metal decorative member 20 was obtained in the same manner as in Example 3 except that the fluorine resin layer 5 was changed to a layer of an ethylene/vinyl alcohol resin.

Example 5

A metal decorative member 20 was obtained in the same manner as in Example 1 except that the thickness of the laminate of the fluorine resin and the acrylic resin was set at 80 μm (thickness of fluorine resin layer 5: 5 μm and thickness of weather-resistant resin layer 4: 75 μm).

Comparative Example 1

A metal decorative member 20 was obtained in the same manner as in Example 1 except that the mass ratio between the PMMA resin and the PMMA resin-based rubber of the weather-resistant resin layer 4 was set at 20:80.

Comparative Example 2

A metal decorative member 20 was obtained in the same manner as in Example 1 except that the mass ratio between the PMMA resin and the PMMA resin-based rubber of the weather-resistant resin layer 4 was set at 80:20.

Comparative Example 3

A metal decorative member 20 was obtained in the same manner as in Example 1 except that the thickness of the laminate of the fluorine resin and the acrylic resin was set at 15 µm (the thickness of the fluorine resin layer 5: 5 µm and the thickness of the weather-resistant resin layer 4: 10 µm).

Comparative Example 4

A metal decorative member 20 was obtained in the same manner as in Example 1 except that the thickness of the laminate of the fluorine resin and the acrylic resin was set at 90 µm (thickness of fluorine resin layer 5: 5 µm and thickness of weather-resistant resin layer 4: 85 µm).

Comparative Example 5

A metal decorative member 20 was obtained in the same manner as in Example 1 except that no UV absorber was added to the weather-resistant resin layer 4.

<Evaluation-On-Judgment Method>
<Evaluation of Incombustibility>

An ignitability test was carried out using a cone calorimeter testing machine conforming to ISOP 5660-1 and according to the fire protection and fireproofing test method and the performance evaluation standards based on Paragraph 9 of Article 2 of the Japanese Building Standards Act and Paragraph 2 of Article 108 of the Regulations of the Building Standards Act. The case that a total heat value ($MJ/m^2$) over 20 minutes after commencement of heating was not larger than 8 $MJ/m^2$ and a maximum heat release rate did not exceed 200 $KW/m^2$ continuously over 10 seconds for 20 minutes after commencement of heating, was evaluated as acceptable "◯". In this regard, it was also made a condition that the substrate was free of cracks or voids.

<Weatherability>

The weatherability was evaluated as follows.

Using a metal weather, a weatherability test was carried out in the following way.

An irradiation mode under the following conditions was carried out over 20 hours and a dew condensation mode under the following conditions was subsequently performed over 4 hours in a dew condensation condition, which was taken as one cycle (24 hours) and performed over 312 hours.

Illumination mode: illumination intensity of 65 $mW/cm^2$ (measured with Unimeter UIT-101, manufactured by Ushio Inc.), BP temperature of 53° C., humidity of 50%, and 20 hours irradiation.

Dew condensation mode: 30° C., 98% and 4 hours (shower spraying for 30 seconds prior to and after the dew condensation mode).

The test was carried out under such conditions as indicated above over 312 hours, after which an appearance was visually confirmed with respect to the degree of color degradation and the peeling. The case that there was no considerable degree of color change and degradation or peeling was judged as acceptable "◯".

<Contamination Resistance>

A 1 cm wide line was drawn on a decorative plate surface with a black magic pen, and a piece of sanitary cotton was soaked in ethanol, followed by wiping off the black magic line. After the wiping off, the case that no considerable change in appearance was found was evaluated as acceptable "◯".

<Evaluation of Wrapping Appropriateness>

Wrapping processing was carried out, and an incombustible decorative sheet 10, which underwent no layer peeling due to the stress thereof, was judged as acceptable.

The results of the evaluations are shown in Tables 7 and 8.

TABLE 7

|  |  |  | Example 1 | | Example 2 | | Example 3 | | Example 4 | |
|---|---|---|---|---|---|---|---|---|---|---|
|  |  |  | Weight ratio (wt %) | Thickness (layer ratio) | Weight ratio (wt %) | Thickness (layer ratio) | Weight ratio (wt %) | Thickness (layer ratio) | Weight ratio (wt %) | Thickness (layer ratio) |
| Decorative sheet portion | outermost layer | PVDF resin |  | 5 |  |  |  | 5 |  |  |
|  |  | EVA resin |  |  |  | 5 |  |  |  | 5 |
|  | weather-resistant resin layer | PMMA resin | 40 | 15 | 40 | 15 | 70 | 15 | 70 | 15 |
|  |  | PMMA resin-based rubber | 60 |  | 60 |  | 30 |  | 30 |  |
|  |  | UV absorber | yes | | yes | | yes | | yes | |
|  |  | total thickness (µm) | 20 | | 20 | | 20 | | 20 | |
|  |  | sheet substrate | PP resin 70µ | | PP resin 70µ | | PP resin 70µ | | PP resin 70µ | |
| Aluminum substrate portion | thickness of aluminum substrate (mm) |  | 1 | | 1 | | 1 | | 1 | |
| Results of evaluation | evaluation of incombustibility |  | ◯ | | ◯ | | ◯ | | ◯ | |
|  | weatherability |  | ◯ | | ◯ | | ◯ | | ◯ | |
|  | contamination resistance |  | ◯ | | ◯ | | ◯ | | ◯ | |
|  | wrapping appropriateness |  | ◯ | | ◯ | | ◯ | | ◯ | |

TABLE 8

|  |  |  | Example 5 | | Comparative Example 1 | | Comparative Example 2 | | Comparative Example 3 | |
|---|---|---|---|---|---|---|---|---|---|---|
|  |  |  | Weight ratio (wt %) | Thickness (layer ratio) | Weight ratio (wt %) | Thickness (layer ratio) | Weight ratio (wt %) | Thickness (layer ratio) | Weight ratio (wt %) | Thickness (layer ratio) |
| Decorative sheet portion | outermost layer | PVDF resin |  | 5 |  | 5 |  | 5 |  | 5 |
|  |  | EVA resin |  |  |  |  |  |  |  |  |
|  | weather-resistant resin layer | PMMA resin | 40 | 75 | 20 | 15 | 80 | 15 | 40 | 10 |
|  |  | PMMA resin-based rubber | 60 |  | 80 |  | 20 |  | 60 |  |

TABLE 8-continued

|  |  |  | | | | |
|---|---|---|---|---|---|---|
| | UV absorber | yes | yes | yes | yes |
| | total thickness (μm) | 80 | 20 | 20 | 15 |
| | sheet substrate | PP resin 70 μμ | PP resin 70 μm | PP resin 70 μm | PP resin 70 μm |
| Aluminum substrate portion | aluminum substrate thickness (nm) | 1 | 1 | 1 | 1 |
| Results of evaluation | incombustibility | ○ | ○ | ○ | ○ |
| | weatherability | ○ | x | ○ | x |
| | contamination resistance | ○ | ○ | ○ | ○ |
| | wrapping appropriateness | ○ | ○ | x | ○ |

| | | | Comparative Example 4 | | Comparative Example 5 | |
|---|---|---|---|---|---|---|
| | | | weight ratio (wt %) | Thickness (layer ratio) | weight ratio (wt %) | Thickness (layer ratio) |
| Decorative sheet portion | outermost layer | PVDF resin EVA resin | | 5 | | 5 |
| | weather-resistant resin layer | PMMA resin | 40 | 80 | 40 | 15 |
| | | PMMA resin-based rubber | 60 | | 60 | |
| | | UV absorber | | yes | | no |
| | | total thickness (μm) | | 85 | | 20 |
| | | sheet substrate | | PP resin 70 μm | | PP resin 70 μm |
| Aluminum substrate portion | aluminum substrate thickness (mm) | | 1 | | 1 |
| Results of evaluation | incombustibility | | x | | ○ |
| | weatherability | | ○ | | x |
| | contamination resistance | | ○ | | ○ |
| | wrapping appropriateness | | x | | ○ |

As will be seen from Tables 7 and 8, the decorative members, to which the incombustible decorative sheets within the ranges of the invention have been applied, are good with respect to all of the incombustibility, weatherability, contamination resistance and wrapping appropriateness.

On the other hand, when the ratio by mass between the PMMA resin and PMMA resin-based rubber of the weather-resistant resin layer 4 is outside the range of the invention as in Comparative Examples 1 and 2, the weatherability and wrapping appropriateness are inferior to those of the incombustible decorative sheets of the examples.

It will be seen from Comparative Example 3 that when the total thickness of the weather-resistant resin layer 4 and the contamination-resistant resin layer (fluorine resin layer 5) is below the range of the invention, inconvenience is involved in weatherability. In contrast, when the total thickness of the weather-resistant resin layer 4 and the contamination-resistant resin layer (fluorine resin layer 5) is over the range of the invention as in Comparative Example 4, a desired degree of incombustibility cannot be assured.

As will be seen from Comparative Example 5, the weatherability is improved when an UV absorber is contained.

Fifth Example

Example 1

In Example 1, a substrate layer 1 was provided using a colored polypropylene. The thickness of the substrate layer 1 was set at 70 μm. The substrate layer 1 was subjected to corona discharge treatment on opposite surfaces thereof, followed by printing a grain pattern on the surface of the substrate layer 1 by gravure printing using a urethane printing ink to provide a design pattern layer 2.

Subsequently, a polyvinylidene fluoride resin and a mixture for the formation of weather-resistant resin layer were melted and extruded by a T die to provide a laminate made of a fluorine resin layer 5 and a weather-resistant resin layer 4. The formulation of the mixture for the formation of weather-resistant resin layer 4 was such that an acrylic resin (constituent units: methyl methacrylate) was 20 parts by mass and an acrylic rubber ("SA-FW 001" (commercial name), manufactured by Kuraray Co., Ltd., methacrylic resin, constituent units: methyl methacrylate, particulate, an average particle size: 100 nm) was 80 parts by mass. The weather-resistant resin layer 4 had a mass ratio between the acrylic resin and acrylic resin-based rubber of 40:60. The laminate had a thickness of the fluorine resin layer 5 of 5 μm, a thickness of the weather-resistant resin layer 4 of 45 μm and a total thickness of 50 μm with thickness of fluorine resin layer 5:thickness of weather-resistant resin layer 4=10:90.

Next, a heat sealing agent (acrylic resin:polyester resin: vinyl chloride acetate resin=1:1:1) was coated onto the design pattern layer 2 to form a transparent adhesion layer 3 (dry thickness: 1.5 μm), on which the above laminate was superposed, followed by thermal lamination under conditions of a film surface temperature of 120° C. Thereafter, the laminate was embossed in a pear skin form under conditions of a sheet surface temperature of 120° C. Subsequently, a urethane-based primer agent, to which a silica powder was added, was coated onto the back surface of the substrate layer 1 to form a back surface primer layer thereby obtaining an incombustible decorative sheet 10.

The thickness (dry thickness) of the back surface primer layer was set at 1 μm. Thereafter, a reaction-type hot melt adhesive 6 (Hybon YR117-1) was coated onto the back surface of the substrate layer 1 to form an adhesive layer 6, followed by lamination to an aluminum substrate serving as a substrate 7 through the adhesive layer 6, thereby obtaining an aluminum decorative member serving as a metal decorative member. The mass of the reaction-type hot melt adhesive in the adhesive layer 6 was at 40 g/m$^2$.

Example 2

The thickness of the fluorine resin layer 5 was set at 20 μm and the thickness of the weather-resistant resin layer 4 was at 30 μm, i.e. adjusted such that thickness of fluorine resin layer 5:thickness of weather-resistant resin layer 4=40:60. Except for this, an aluminum decorative member was made in the same manner as in Example 2.

Example 3

The mass ratio between the acrylic resin and acrylic resin-based rubber of the weather-resistant resin layer 4 was adjusted to 70:30. Except for this, an aluminum decorative member of Example 3 was made in the same manner as in Example 1.

Example 4

The thickness of the fluorine resin layer 5 was set at 20 μm and the thickness of the weather-resistant resin layer 4 was at 30 μm, i.e. adjusted such that thickness of fluorine resin layer 5:thickness of weather-resistant resin layer 4=40:60. Except for this, an incombustible decorative sheet 10 of Example 4 was made in the same manner as in Example 3.

Comparative Example 1

The mass of the hot melt adhesive of the adhesive layer 6 was adjusted to 20 g/m$^2$. Except for this, an aluminum decorative member of Comparative Example 1 was made in the same manner as in Example 1.

Comparative Example 2

The mass of the hot melt adhesive of the adhesive layer 6 was adjusted to 55 g/m$^2$. Except for this, an aluminum decorative member of Comparative Example 2 was made in the same manner as in Example 1.

Comparative Example 3

A solvent-type two-part urethane adhesive (main agent "No 5211" and curing agent "U-5" with a formulation ratio of 100:5, manufactured by No-Tape Industrial Co., Ltd.) was used as an adhesive of the adhesive layer 6. The mass of the adhesive was adjusted to 25 g/m$^2$. Except for the above, an aluminum decorative member of Comparative Example 3 was made in the same manner as in Example 1.

Comparative Example 4

The thickness of the fluorine resin layer 5 was set at 10 μm and the thickness of the weather-resistant resin layer 4 was at 40 μm, i.e. adjusted such that thickness of fluorine resin layer 5:thickness of weather-resistant resin layer 4=20:80. The mass ratio between the acrylic resin and the acrylic resin-based rubber of the weather-resistant resin layer 4 was set at 80:20. Except for this, an aluminum decorative member of Comparative Example 4 was made in the same manner as in Example 1.

Comparative Example 5

The mass ratio between the acrylic resin and the acrylic resin-based rubber of the weather-resistant resin layer 4 was set at 80:20. Except for this, an aluminum decorative member of Comparative Example 5 was made in the same manner as in Comparative Example 4.

Comparative Example 6

The thickness of the fluorine resin layer 5 was set at 2 μm and the thickness of the weather-resistant resin layer 4 was at 48 μm, i.e. adjusted such that thickness of fluorine resin layer 5:thickness of weather-resistant resin layer 4=4:96. The mass ratio between the acrylic resin and the acrylic resin-based rubber of the weather-resistant resin layer 4 was adjusted to 50:50. Except for the above, an aluminum decorative member of Comparative Example 6 was made in the same manner as in Example 1.

Comparative Example 7

The thickness of the fluorine resin layer 5 was set at 25 μm and the thickness of the weather-resistant resin layer 4 was at 25 μm, i.e. adjusted such that thickness of fluorine resin layer 5:thickness of weather-resistant resin layer 4=50:50. Except for the above, an aluminum decorative member of Comparative Example 7 was made in the same manner as in Comparative Example 6.

(Judgment on Evaluation)

The aluminum decorative members of the foregoing examples and comparative examples were subjected to the following evaluations.

(Incombustibility)

Incombustibility was evaluated in the following way.

An ignitability test was carried out using a cone calorimeter testing machine conforming to ISO 5660-1 and according to the fire protection and fireproofing test method and the performance evaluation standards based on Paragraph 9 of Article 2 of the Japanese Building Standards Act and Paragraph 2 of Article 108 of the Regulations of the Building Standards Act. The case that a total heat value (MJ/m$^2$) over 20 minutes after commencement of heating was not larger than 8 MJ/m$^2$ and a maximum heat release rate did not exceed 200 KW/m$^2$ continuously over 10 seconds for 20 minutes after commencement of heating was evaluated as acceptable "◯". In this regard, it was also made a condition that the substrate was free of cracks or voids.

(Adhesion)

The adhesion was evaluated in the following way.

180-Degree, Normal-State Adhesion Strength Test

The end portion of an incombustible decorative sheet 10 was artificially peeled off by one inch in width from an aluminum substrate 7 and was bent along an angle of 180°, followed by applying a tensile load by means of a tensile tester at a normal temperature to measure a load upon peeling. The tensile rate was at 200 mm/minute.

90-Degree, Normal-State Adhesion Strength Test

The end portion of an incombustible decorative sheet 10 was artificially peeled off by one inch in width from an aluminum substrate 7 and bent along an angle of 90°, followed by applying a tensile load by means of a tensile tester at a normal temperature to measure a load upon peeling. The tensile rate was at 200 mm/minute.

90-Degree, Heat and Humidity Resistant Creep Test

The end portion of an incombustible decorative sheet 10 was artificially peeled off by one inch in width from an aluminum substrate 7 and applied with a load of 500 g in an environment of 40° C. and 90% along an angle of 90° over 9 days to measure a peeled length.

The case that the 180-degree normal state adhesion strength was not less than 50 N/inch, the 90-degree normal state adhesion strength was not less than 30 N/inch, and the 90-degree heat and humidity resistant creep is not less than 10 mm was evaluated as acceptable "○".

(Wrapping Appropriateness (Processability))

Wrapping appropriateness, or processability was evaluated in the following way.

Wrapping processing (profile processing) was carried out. An incombustible decorative sheet 10 that did not undergo layer peeling due to the stress thereof occurring immediately after the wrapping processing was evaluated as acceptable "○".

(Weatherability)

The weatherability was evaluated in the following way.

Using a metal weather, the weatherability was assessed as follows.

A sheet was subjected to irradiation over 20 hours according to an irradiation mode of the following conditions and also to a dew condensation mode of the following conditions carried out in a dew condensation condition over 4 hours, which was taken as one cycle (24 hours) and performed over 312 hours.

Irradiation mode: illumination intensity of 65 mW/cm$^2$ (measured by Unimeter UIT-101, manufactured by Ushio Inc.), BP temperature of 53° C., humidity of 50% and irradiation over 20 hours.

Dew condensation mode: 30° C., 98%, 4 hours, (shower spraying for 30 seconds prior to and after the dew condensation mode).

The test was carried out for 312 hours, after which the degrees of color degradation in appearance and peeling were visually confirmed. The case of no considerable degree of color change or degradation, or peeling was evaluated as acceptable "○".

The results of the evaluations are shown in Tables 9, 10, and 11.

TABLE 9

|  | Example 1 | Comparative Example 1 | Comparative Example 2 | Comparative Example 3 |
|---|---|---|---|---|
| Fluorine resin layer Thickness (μm) | 5 | 5 | 5 | 5 |
| Acrylic resin layer Thickness | 45 | 45 | 45 | 45 |
| Transparent adhesive layer Thickness (μm) | 1.5 | 1.5 | 1.5 | 1.5 |
| Substrate layer | PP-based print sheet | PP-based print sheet | PP-based print sheet | PP-based print sheet |
| Adhesive layer weight (g/m$^2$) | Hybon YR117-1 of Hitachi Chemical Co. Ltd. 40 | Hybon YR117-1 of Hitachi Chemical Co. Ltd. 20 | Hybon YR117-1 of Hitachi Chemical Co. Ltd. 55 | No. 5211 of No-Tape Industrial Co. Ltd. 25 |
| Aluminum substrate | aluminum | aluminum | aluminum | aluminum |
| Incombustibility | ○ | ○ | x | ○ |
| Adhesion | ○ | x | ○ | x |
| 180-degree, normal state adhesion strength (N/inch) | 63.5 | 40.5 | 88.2 | 52.8 |
| 90-degree, normal state adhesion strength (N/inch) | 40.8 | 20.4 | 56.6 | 30.4 |
| 90-degree heat and humidity resistant creep (mm) | 0 | weight dropped | 0 | weight dropped |

From Table 9, it has been revealed that as is typically shown in Example 1, where Example 1 was carried out while satisfying the range of the invention in such a way that the adhesive layer 6 is formed of the hot melt adhesive and the mass of the reaction-type hot melt adhesive in the adhesive layer 6 is set at 37 g/m$^2$ to 46 g/m$^2$, the incombustibility and adhesion are both good. When Example 1 was carried out such that the mass of the reaction-type hot melt adhesive in the adhesive layer 6 was set in the range of 37 g/m$^2$ to 46 g/m$^2$ and was thus adjusted within the range of the invention, similar results as in Example 1 were obtained.

It will be noted that as is typically shown in Comparative Example 1, where the mass of the reaction-type hot melt adhesive is lower than 37 g/m$^2$ (lower limit value), the adhesion was evaluated as unacceptable "x". As is typically shown in Comparative Example 2, where the amount is larger than 46 g/m$^2$ (upper limit value), the incombustibility was evaluated as unacceptable "x". Moreover, as is typically shown in Comparative Example 3, where the adhesive layer 6 did not make use of a reaction-type hot melt adhesive and the mass was less than 37 g/m$^2$, the adhesion was evaluated as unacceptable "x".

TABLE 10

| | | | Example 1 | | Example 2 | | Example 3 | | Example 4 | |
|---|---|---|---|---|---|---|---|---|---|---|
| | | | Mass ratio (wt %) | Thickness (layer ratio) | Mass ratio (wt %) | Thickness (layer ratio) | Mass ratio (wt %) | Thickness (layer ratio) | Mass ratio (wt %) | Thickness (layer ratio) |
| Decorative sheet | fluorine resin layer | PVDF resin | | 5 (10) | | 20 (40) | | 5 (10) | | 20 (40) |
| | weather-resistant resin layer | PMMA resin | 40 | 45 (90) | 40 | 30 (60) | 70 | 45 (90) | 70 | 30 (60) |
| | | PMMA resin-based rubber | 60 | | 60 | | 30 | | 30 | |
| | | total thickness (μm) | | 50 | | 50 | | 50 | | 50 |
| Metal plate | substrate layer | | PP resin 70 μm | | PP resin 70 μm | | PP resin 70 μm | | PP resin 70 μm | |
| | aluminum plate thickness (mm) | | 1 | | 1 | | 1 | | 1 | |
| Results of evaluation | incombustibility | | ○ | | ○ | | ○ | | ○ | |
| | wrapping appropriateness (processability) | | ○ | | ○ | | ○ | | ○ | |
| | weatherability | | ○ | | ○ | | ○ | | ○ | |

TABLE 11

| | | | Comparative Example 4 | | Comparative Example 5 | | Comparative Example 6 | | Comparative Example 7 | |
|---|---|---|---|---|---|---|---|---|---|---|
| | | | Mass ratio (wt %) | Thickness (layer ratio) | Mass ratio (wt %) | Thickness (layer ratio) | Mass ratio (wt %) | Thickness (layer ratio) | Mass ratio (wt %) | Thickness (layer ratio) |
| Decorative sheet | fluorine resin layer | PVDF resin | | 10 (20) | | 10 (20) | | 2 (4) | | 25 (50) |
| | weather-resistant resin layer | PMMA resin | 20 | 40 (80) | 80 | 40 (80) | 50 | 48 (96) | 50 | 25 (50) |
| | | PMMA resin-based rubber | 80 | | 20 | | 50 | | 50 | |
| | | total thickness (μm) | | 50 | | 50 | | 50 | | 50 |
| Metal plate | substrate layer | | PP resin 70 μm | | PP resin 70 μm | | PP resin 70 μm | | PP resin 70 μm | |
| | aluminum plate thickness (mm) | | 1 | | 1 | | 1 | | 1 | |
| Results of evaluation | incombustibility | | ○ | | ○ | | x | | ○ | |
| | wrapping appropriateness (processability) | | ○ | | x | | ○ | | x | |
| | weatherability | | x | | ○ | | ○ | | ○ | |

It has been found from Tables 10 and 11 that as is typically shown in Examples 1 to 4, where the acrylic resin ranges from 40 mass % to 70 mass % and the acrylic resin-based rubber ranges from 30 mass % to 60 mass %, a ratio in thickness between the fluorine resin layer 5 and the weather-resistant resin layer 4 is within a range of from 10:90 to 40:60, and thus, the ranges of the invention are satisfied, the incombustibility, processability and weatherability are all good. Example 1 was carried out while adjusting within the ranges of the invention such that the acrylic resin ranges from 40 mass % to 70 mass %, the acrylic resin-based rubber ranged from 30 mass % to 60 mass % and a ratio in thickness between the fluorine resin layer 5 and the weather-resistant resin layer 4 was within a range of from 10:90 to 40:60, similar effects as in Examples 1 to 4 were obtained.

It will be noted that as is typically shown in Comparative Example 4, where the acrylic resin is less than 40 mass % (lower limit value) and the acrylic resin-based rubber is larger than 60 mass % (upper limit value), the weatherability has been evaluated as unacceptable "x". As is typically shown in Comparative Example 5, where the acrylic resin is larger than 70 mass % (upper limit value) and the acrylic resin-based rubber is less than 30 mass % (lower limit value), the processability has been evaluated as unacceptable "x". In contrast, as is typified by Examples 1 to 4, where the acrylic resin of the weather-resistant resin layer 4 ranges from 40 mass % to 70 mass % and the acrylic resin-based rubber ranges from 30 mass % to 60 mass %, the weatherability and processability can be both made good.

As is typified by Comparative Example 6, when the ratio between the fluorine resin layer 5 and the weather-resistant resin layer 4 is outside the range of from 10:90 to 40:60 (4:96), the incombustibility has been evaluated as unacceptable "x". As is typically shown in Comparative Example 7, when the ratio between the fluorine resin layer 5 and the weather-resistant resin layer 4 is outside the range of 10:90 to 40:60 (50:50), the processability has been evaluated as unacceptable "x". In contrast, as is typified by Examples 1 to 4, the ratio between the fluorine resin layer 5 and the weather-resistant resin layer 4 is within a range of from 10:90 to 40:60, the incombustibility and processability can be both made good.

Sixth Example

Example 1

A 10 μm thick anodized film 51 was formed on a metal substrate 7 made of an aluminum alloy plate. An acrylic resin was baking finished on the anodized film 51 in an amount of 10 g/m² to obtain an aluminum mold material.

An incombustible decorative sheet 10 having the following configuration was laminated on the aluminum mold material through an adhesive layer 6 to obtain an aluminum decorative member.

A polyurethane two-part adhesive (main agent "No 5211" and curing agent "U-5" with a formulation ratio of 100:5), manufactured by No-Tape Industrial Co., Ltd., was used for the adhesive layer 6 and was coated directly onto the back surface of the substrate 7 of the incombustible decorative sheet 10 in a coating amount (dry) of 25 g/m² and laminated to the aluminum mold material.

(Incombustible Decorative Sheet 10)

A polyvinylidene fluoride (fluorine resin) and a mixture for the formation of acrylic resin layer were melted and extruded by means of a T die to form a laminate made of a fluorine resin layer 5 and a weather-resistant resin layer 4 (thickness of fluorine resin layer 5: 5 μm, thickness of weather-resistant resin layer 4: 45 μm).

A design layer 2 of a grain pattern was formed by printing on the surface of a 70 μm thick substrate layer 1 made of a thermoplastic resin by use of a urethane printing ink.

A heat sealing agent (acrylic/vinyl chloride acetate/polyester=1/1/1) was coated onto the design layer 2 in a dry thickness of 1.5 μm to form a heat sealing agent layer, on which the laminate was superposed, followed by thermal lamination under conditions of a film surface temperature of 120° C.

A grain vessel channel pattern was embossed on the surface of the laminate under conditions of a sheet surface temperature of 120° C. Finally, a urethane primer agent, to which a silica powder was added, was coated on the back surface of the substrate layer 1 in a dry thickness of 1 μm to form a back surface primer layer, thereby making an incombustible decorative sheet 10 of Example 1.

The mixture for the formation of the acrylic resin layer had the following formulation.

Acrylic resin (constituent units: methyl methacrylate): 45 parts by mass

Acrylic rubber ("SA-FW100 (commercial name)" manufactured by Kuraray Co., Ltd., constituent units: methyl methacrylate, particulate, average particle size: 100 nm): 55 parts by mass Comparative Example 1

An aluminum decorative member was obtained in the same manner as in Example 1 except that the coating amount of the adhesive layer 6 was changed to 13 g/m².

Comparative Example 2

An aluminum decorative member was obtained in the same manner as in Example 1 except that the coating amount of the adhesive layer 6 was changed to 30 g/m².

Comparative Example 3

An aluminum decorative member was obtained in the same manner as in Example 1 except that the acrylic film on the aluminum substrate of Example 1 was formed by electrodeposition coating.

<Judgment on Evaluation>

The aluminum decorative members of the foregoing examples and comparative examples were evaluated in the following way.

(Evaluation of Incombustibility)

An ignitability test was carried out using a cone calorimeter testing machine conforming to ISO 5660-1 and according to the fire protection and fireproofing test method and the performance evaluation standards based on Paragraph 9 of Article 2 of the Japanese Building Standards Act and Paragraph 2 of Article 108 of the Regulations of the Building Standards Act.

The case that a total heat value (MJ/m²) over 20 minutes after commencement of heating was not larger than 8 MJ/m² and a maximum heat release rate did not exceed 200 KW/m² continuously over 10 seconds for 20 minutes after commencement of heating was evaluated as acceptable "○". In this regard, it was also made a condition that the substrate 7 was free of cracks or voids.

<Incombustible Decorative Sheet Adhesion>

The following two tests were carried out as adhesion test.

(Normal State Adhesion Strength Test)

The end portion of an incombustible decorative sheet 10 was artificially peeled off from an aluminum substrate 7 and was bent along an angle of 180°, followed by applying a tensile load by means of a tensile tester at a normal temperature at a tensile rate of 200 mm/minute to measure a load upon peeling.

(Moisture-Resistant Adhesion Strength Test)

An aluminum decorative member was allowed to stand in a constant temperature and humidity chamber of 40° C. and 90% for 192 hours. Next, the member was removed from the constant temperature and humidity chamber and dried at a normal temperature for 1 week.

Thereafter, the end portion of the incombustible decorative sheet 10 was artificially peeled off from the aluminum mold material and bent along an angle of 180°, followed by applying a tensile load at a normal temperature by means of a tensile tester at a tensile rate of 200 mm/minute to measure a load upon peeling.

The results of the evaluations are shown in Table 12.

TABLE 12

|  | Example | Comparative Example | | |
|---|---|---|---|---|
|  | 1 | 1 | 2 | 3 |
| Fluorine resin layer Thickness (μm) | 5 | 5 | 5 | 5 |
| Acrylic resin layer Thickness (μm) | 45 | 45 | 45 | 45 |
| Heat sealing agent Coating amount (g/m²) | 1.5 | 1.5 | 1.5 | 1.5 |
| Substrate | PP-based print sheet | PP-based print sheet | PP-based print sheet | PP-based print sheet |
| Wrapping Adhesive layer Coating amount (g/m²) | 25 | 13 | 30 | 25 |
| Coated film | acrylic baked film | acrylic baked film | acrylic baked film | acrylic baked film |

TABLE 12-continued

| | Example | Comparative Example | | |
|---|---|---|---|---|
| | 1 | 1 | 2 | 3 |
| Amount (g/m²) | 10 | 10 | 10 | 10 |
| Anodized film Thickness (μm) | 10 | 10 | 10 | 10 |
| Metal substrate | aluminum alloy plate | aluminum alloy plate | aluminum alloy plate | aluminum alloy plate |
| Evaluation of incombustibility | ○ | ○ | x | ○ |
| Adhesion of decorative sheet Normal state adhesion strength (N/inch) | 55 ○ | 20 x | 56 ○ | 51 ○ |
| peeled face | wrapping adhesive agent/coated film | wrapping adhesive agent/coated film | wrapping adhesive agent/coated film | wrapping adhesive agent/coated film |
| Moisture resistant adhesion strength (N/inch) | 56 ○ | 20 x | 56 ○ | 7 x |
| peeled face | wrapping adhesive agent/coated film | wrapping adhesive agent/coated film | wrapping adhesive agent/coated film | coated film/anodized film |

As will be seen from Table 12, the one or two weather-resistant resin layers 4 and the fluorine resin layer 5 are formed, in this order, on one surface side of the thermoplastic resin substrate layer 1 serving as an incombustible decorative sheet 10, wherein the weather-resistant resin layer 4 contains an acrylic rubber and an acrylic resin at a ratio by mass between the acrylic rubber and the acrylic resin of 30:70 to 60:40, and the solid content of the urethane resin-based adhesive is set at 13.0 g/m² to 25.0 g/m², under which incombustibility is evaluated as good (see Example 1 and Comparative Examples 1, 3). On the other hand, when the solid content of the urethane resin-based adhesive is larger, as in Comparative Example 2, than the range of the invention, the incombustibility was not evaluated as acceptable.

It will be noted that when the evaluation was made in such a way that the solid content of the urethane resin-based adhesive was changed to not larger than 26.4 g/m² under the conditions of Example 1, such evaluations as in Example 1 were obtained.

Further, where a coating resin was baking finished on the anodized film 51 to form a coating film layer 52, on which an incombustible decorative sheet 10 was laminated through a urethane resin-based adhesive layer 6, the adhesion of the incombustible decorative sheet 10 is improved (see Example 1 and Comparative Example 3).

However, where the solid content of the urethane resin-based adhesive is small even when the coating film layer 52 is formed by the baking finishing as in Comparative Example 1, the adhesion of the incombustible decorative sheet lowers. In this connection, the adhesion of the incombustible decorative sheet is improved over the case of Comparative Example 3 wherein the coated film layer 52 is not formed by baking finishing and the solid content of the urethane resin-based adhesive is less than in Comparative Example 1.

Accordingly, in order to ensure the incombustibility and the adhesion of incombustible decorative sheet than the prescribed ones, it is preferred that the coating film layer 52 is formed by baking finishing, the ratio by mass between the acrylic rubber and the acrylic resin is set at 30:70 to 60:40, and the solid content of the urethane resin-based adhesive is set at 15.0 g/m² to 26.4 g/m².

Seventh Example

Example 1

In Example 1, a substrate layer 1 was provided using a colored polypropylene resin. The substrate layer 1 had a thickness of 70 μm.

The substrate layer was subjected to corona discharge treatment on front and back surfaces thereof, respectively. Subsequently, a grain pattern was printed by gravure printing using a urethane printing ink to provide a design pattern layer 2. Thereafter, a back surface primer layer was formed on the back surface of the substrate layer 1 by gravure printing using a coating solution for back surface primer layer. The formulation of the coating solution for back surface primer layer was one which was comprised of 100 parts by mass of a two-part curing polyester urethane (wherein a polyester polyol and a polyisocyanate were mixed at a ratio (mass ratio) of 100:5) and 20 parts by mass of a diluent solvent (which was a mixed solvent of ethyl acetate and methyl isobutyl ketone at a ratio (mass ratio) of 1:1). The back surface primer layer had a thickness of 1 μm.

Subsequently, a polyvinylidene fluoride resin and a mixture for the formation of weather-resistant resin layer were melted and extruded by means of a T die to provide a laminate made of a fluorine resin layer 5 and a weather-resistant resin layer 4. The formulation of the mixture for the formation of weather-resistant resin layer 4 was comprised of 20 parts by mass of an acrylic resin (constituent units: methyl methacrylate, PMMA resin) and 80 parts by mass of an acrylic rubber ("SA-FW 001" (commercial name), manufactured by Kuraray Co., Ltd., methacrylic resin, constituent units: methyl methacrylate, particulate, an average particle size: 100 nm, PMMA resin-based rubber). The weather-resistant resin layer 4 was such that a ratio by mass between the acrylic resin (PMMA resin) and the acrylic resin-based rubber (PMMA resin-based rubber) was set at 40:60. The laminate had a thickness of the fluorine resin layer 5 of 5 μm and a thickness of the weather-resistant resin layer 4 of 45 μm, and thus, the total thickness was at 50 μm with the thickness of the fluorine resin layer 5:the thickness of the weather-resistant resin layer 4=10:90.

Next, a coating solution made of a two-part curing urethane adhesive having a polyester resin as a main chain was coated on the design pattern 2 to form a transparent adhesive layer 3 (dry thickness: 6 μm), followed by laminating the laminate formed above according to a dry lamination process to provide an incombustible decorative sheet 10. Thereafter, a two-part curing urethane adhesive (coating amount of 25 g/m2 in dry state) was applied onto the incombustible decorative sheet 10 to form an adhesive layer 6, following by further lamination of a composite panel 70 through the adhesive layer 6 to obtain a decorative member 20. The thickness of the mixed resin layer 7a (core) of the composite panel 70 was at 3 mm. The material for the metal substrate 7b used was aluminum. The thickness of the metal substrate 7 was at 0.5 mm.

Example 2

The thickness of the fluorine resin layer 5 was set at 20 μm and the thickness of the weather-resistant resin layer 4 was at 30 μm, i.e. adjusted such that thickness of fluorine resin layer 5:thickness of weather-resistant resin layer 4=40:60. Except for the above, an incombustible decorative sheet 10 of Example 2 was made in the same manner as in Example Example 3

The ratio by mass between the acrylic resin and the acrylic resin-based rubber of the weather-resistant resin layer 4 was adjusted to 70:30. Except for this, an incombustible decorative sheet 10 of Example 3 was made in the same manner as in Example 1.

Example 4

The thickness of the fluorine resin layer 5 was set at 20 μm and the thickness of the weather-resistant resin layer 4 was at 30 μm, i.e. adjusted such that thickness of fluorine resin layer 5:thickness of weather-resistant resin layer 4=40:60. Except for the above, an incombustible decorative sheet 10 of Example 4 was made in the same manner as in Example 3.

Comparative Example 1

The thickness of the fluorine resin layer 5 was set at 10 μm and the thickness of the weather-resistant resin layer 4 was set at 40 μm, i.e. adjusted such that thickness of fluorine resin layer 5:thickness of weather-resistant resin layer 4=20:80. The ratio by mass between the acrylic resin and the acrylic resin-based rubber of the weather-resistant resin layer 4 was adjusted to 20:80. Except for the above, an incombustible decorative sheet of Comparative Example 1 was made in the same manner as in Example 1.

Comparative Example 2

The ratio by mass between the acrylic resin and the acrylic resin-based rubber of the weather-resistant resin layer 4 was adjusted to 80:20. Except for the above, an incombustible decorative sheet of Comparative Example 2 was made in the same manner as in Comparative Example 1.

Comparative Example 3

The thickness of the fluorine resin layer 5 was set at 2 μm and the thickness of the weather-resistant resin layer 4 was set at 48 μm, i.e. adjusted such that thickness of fluorine resin layer 5:thickness of weather-resistant resin layer 4=4:96. The ratio by mass between the acrylic resin and the acrylic resin-based rubber of the weather-resistant resin layer 4 was adjusted to 50:50. Except for the above, an incombustible decorative sheet of Comparative Example 3 was made in the same manner as in Example 1.

Comparative Example 4

The thickness of the fluorine resin layer 5 was set at 25 μm and the thickness of the weather-resistant resin layer 4 was set at 25 μm, i.e. adjusted such that thickness of fluorine resin layer 5:thickness of weather-resistant resin layer 4=50:50. Except for this, an incombustible decorative sheet of Comparative Example 4 was made in the same manner as in Comparative Example 3.

<Judgment on Evaluation>

The incombustibility was evaluated in the following way. An ignitability test was carried out using a cone calorimeter testing machine conforming to ISO 5660-1 and according to the fire protection and fireproofing test method and the performance evaluation standards based on Paragraph 9 of Article 2 of the Japanese Building Standards Act and Paragraph 2 of Article 108 of the Regulations of the Building Standards Act.

The case that a total heat value ($MJ/m^2$) over 20 minutes after commencement of heating was not larger than 8 $MJ/m^2$ and a maximum heat release rate did not exceed 200 $KW/m^2$ continuously over 10 seconds for 20 minutes after commencement of heating was evaluated as acceptable "◯". In this regard, it was also made a condition that the substrate was free of cracks or voids.

(Wrapping Appropriateness (Processability))

Wrapping appropriateness, i.e. processability, was assessed as follows.

Wrapping processing (profile processing) was performed. The case that no sheet peeling due to the stress of an incombustible decorative sheet 10 occurred immediately after wrapping processing was evaluated as acceptable "◯".

(Weatherability)

The weatherability was evaluated as follows.

Using a metal weather, weatherability was evaluated as follows.

After an irradiation mode under the following conditions was carried out for 20 hours, a dew condensation mode under the following conditions was performed for 4 hours, which was taken as one cycle (24 hours) and performed over 312 hours.

Illumination mode: illumination intensity of 65 $mW/cm^2$ (measured with Unimeter UIT-101, manufactured by Ushio Inc.), BP temperature of 53° C., humidity of 50%, and 20 hours irradiation.

Dew condensation mode: 30° C., 98% and 4 hours (shower spraying for 30 seconds prior to and after the des condensation mode).

The test was carried out under such conditions as indicated above for 312 hours, after which an appearance was visually confirmed with respect to the degree of its color degradation and the peeling. The case that there was no considerable degree of color change and degradation or the peeling was evaluated as acceptable "◯".

The results of the evaluations are shown in Tables 13 and 14.

TABLE 13

| | | | Example 1 | | Example 2 | | Example 3 | | Example 4 | |
|---|---|---|---|---|---|---|---|---|---|---|
| | | | Mass ratio (wet %) | Thickness (layer ratio) | Mass ratio (wt %) | Thickness (layer ratio) | Mass ratio (wt %) | Thickness (layer ratio) | Mass ratio (wt %) | Thickness (layer ratio) |
| Decorative sheet | Fluorine resin layer | PVDF resin | | 5 (10) | | 20 (40) | | 5 (10) | | 20 (40) |
| | Weather-resistant resin layer | PMMA resin | 40 | 45 (90) | 40 | 30 (60) | 70 | 45 (90) | 70 | 30 (60) |
| | | PMMA resin-based rubber | 60 | | 60 | | 30 | | 30 | |
| | | Total thickness (μm) | | 50 | | 50 | | 50 | | 50 |
| | Substrate layer | | PP resin 70μ | | PP resin 70μ | | PP resin 70μ | | PP resin 70μ | |
| Results of evaluations | Incombustibility | | ○ | | ○ | | ○ | | ○ | |
| | Wrapping appropriateness (processability) | | ○ | | ○ | | ○ | | ○ | |
| | Weatherability | | ○ | | ○ | | ○ | | ○ | |

TABLE 14

| | | | Comparative Example 1 | | Comparative Example 2 | | Comparative Example 3 | | Comparative Example 4 | |
|---|---|---|---|---|---|---|---|---|---|---|
| | | | Mass ratio (wt %) | Thickness (layer ratio) | Mass ratio (wt %) | Thickness (layer ratio) | Mass ratio (wt %) | Thickness (layer ratio) | Mass ratio (wt %) | Thickness (layer ratio) |
| Decorative sheet | Fluorine resin layer | PVDF resin | | 10 (20) | | 10 (20) | | 2 (4) | | 25 (50) |
| | Weather-resistant resin layer | PMMA resin | 20 | 40 (80) | 80 | 40 (60) | 50 | 48 (96) | 50 | 25 (50) |
| | | PMMA resin-based rubber | 80 | | 20 | | 50 | | 50 | |
| | | Total thickness (μm) | | 50 | | 50 | | 50 | | 50 |
| | Substrate layer | | PP resin 70μ | | PP resin 70μ | | PP resin 70μ | | PP resin 70μ | |
| Results of evaluation | Incombustibility | | ○ | | ○ | | x | | ○ | |
| | Wrapping appropriateness (processability) | | ○ | | x | | ○ | | x | |
| | Weatherability | | x | | ○ | | ○ | | ○ | |

As is typically shown in Examples 1 to 4, Tables 13, 14 reveal that where the ranges of the invention are so satisfied that the acrylic resin is set at 40 mass % to 70 mass %, the acrylic resin-based rubber is set at 30 mass % to 60 mass %, and the ratio in thickness between the fluorine resin layer 5 and the weather-resistant resin layer is set within a range of from 10:90 to 40:60, the incombustibility, processability and weatherability are all good. When Example 1 was carried out while adjusting within the ranges of the invention in such a way that the acrylic resin was set at 40 mass % to 70 mass %, the acrylic resin-based rubber was set at 30 mass % to 60 mass %, and the ratio in thickness between the fluorine resin layer 5 and the weather-resistant resin layer 4 was set within a range of from 10:90 to 40:60, similar results are in Examples 1 to 4 were obtained.

It will be noted that as is typically shown in Comparative Example 1, when the acrylic resin is less than 40 mass % (lower limit value) and the acrylic resin-based rubber is larger than 60 mass % (upper limit value), the weatherability has been evaluated as unacceptable "x". As is typically shown in Comparative Example 2, when the acrylic resin is larger than 70 mass % (upper limit value) and the acrylic resin-based rubber is less than 30 mass % (lower limit value), the processability has been evaluated as unacceptable "x". In contrast, as is typified by Examples 1 to 4, when the acrylic resin of the weather-resistant resin layer 4 ranges from 40 mass % to 70 mass % and the acrylic resin-based rubber ranges from 30 mass % to 60 mass %, the weatherability and processability could be both good.

As is typified by Comparative Example 3, when the ratio between the fluorine resin layer 5 and the weather-resistant resin layer 4 is outside the range of from 10:90 to 40:60 (4:96), the incombustibility has been evaluated as unacceptable "x". As is typically shown in Comparative Example 4, when the ratio between the fluorine resin layer 5 and the weather-resistant resin layer 4 is outside the range of 10:90 to 40:60 (50:50), the processability has been evaluated as unacceptable "x". In contrast, as is typified by Examples 1 to 4, the ratio between the fluorine resin layer 5 and the weather-resistant resin layer 4 is within a range of from 10:90 to 40:60, the incombustibility and processability can be both good.

Eighth Example

Example 1

A colored polypropylene resin was adopted as a colored thermoplastic resin, and a 70 μm thick resin sheet was provided as a substrate layer 1.

The substrate layer 1 was subjected to corona discharge treatment on the front and back surfaces thereof, followed by forming a grain pattern on the surface by gravure printing using a urethane printing ink to obtain a design pattern layer 2 (thickness: 2 μm).

On the other hand, a back surface primer layer (thickness: 1 μm) was formed on the back surface of the substrate layer 1 by gravure printing using a coating solution for back surface primer layer having the following formulation.

Next, a polyvinylidene fluoride resin (fluorine resin) and a mixture for the formation of weather-resistant resin layer were melted and extruded by a T die to form a laminate made of a fluorine resin layer (outermost layer 5) and an acrylic resin layer (inside layer 4) having a ratio by mass between a PMMA resin and a PMMA resin-based rubber of 40/60 (thickness of the fluorine resin layer: 2 μm, thickness of the acrylic resin layer: 18 μm, total thickness: 20 μm). This laminate became a two-layer transparent thermoplastic resin layer.

Further, a transparent adhesive layer 3 (dry thickness: 6 μm) was formed on the design pattern layer 2 by coating a coating solution made of a two-part curing urethane adhesive having a polyester resin as a main chain, on which the laminate formed above was laminated by a dry lamination process to obtain an incombustible decorative sheet 10 of this example.

(Coating Solution for Back Surface Primer Layer)
The coating solution for back surface primer layer had the following formulation.

Two-part curing polyester urethane (mixed at a ratio (mass ratio) of a polyester polyol and a polyisocyanate of 100:5): 100 parts by mass Diluent solvent (mixed solvent obtained by mixing at a ratio (mass ratio) of ethyl acetate and methyl isobutyl ketone of 1:1): 20 parts by mass (Mixture for the Formation of Acrylic Resin Layer)
The mixture for the formation of the acrylic resin layer had the following formulation.

Acrylic resin (constituent units: methyl methacrylate): 20 parts by mass Acrylic rubber ("SA-FW 001" (commercial name), manufactured by Kuraray Co., Ltd., methacrylic resin, constituent units: methyl methacrylate, particulate, an average particle size: 100 nm): 80 parts by mass (Aluminum Decorative Plate)
The incombustible decorative sheet 10 was laminated on a 0.5 mm thick aluminum plate through a two-part curing urethane adhesive (dry coating amount: 25 g/m$^2$) to make an aluminum decorative plate.

Example 2

An aluminum decorative plate was obtained in the same manner as in Example 1 except that the total thickness of the fluorine resin layer and the acrylic resin layer (with a thickness of the fluorine resin layer of 8 μm and a thickness of acrylic resin layer of 72 μm) was set at 80 μm.

Example 3

An aluminum decorative plate was obtained in the same manner as in Example 2 except that the ratio by mass between the PMMA resin and PMMA resin-based rubber of the acrylic resin layer was set at 70/30.

Example 4

An aluminum decorative plate was obtained in the same manner as in Example 2 except that the thickness of the aluminum plate was set at 0.8 mm.

Comparative Example 1

An aluminum decorative plate was obtained in the same manner as in Example 2 except that the ratio by mass between the PMMA resin and the PMMA resin-based rubber of the acrylic resin layer was set at 20/80.

Comparative Example 2

An aluminum decorative plate was obtained in the same manner as in Example 2 except that the ratio by mass between the PMMA resin and the PMMA resin-based rubber of the acrylic resin layer was set at 90/10.

Comparative Example 3

An aluminum decorative plate was obtained in the same manner as in Example 3 except that the total thickness of the laminate made of the fluorine resin layer and the acrylic resin layer was set at 10 μm (with a thickness of the fluorine resin layer of 1 μm and a thickness of the acrylic resin layer of 9 μm).

Comparative Example 4

An aluminum decorative plate was obtained in the same manner as in Example 3 except that the total thickness of the laminate made of the fluorine resin layer and the acrylic resin layer was set at 100 μm (with a thickness of the fluorine resin layer of 10 μm and a thickness of the acrylic resin layer of 90 μm).

Comparative Example 5

An aluminum decorative plate was obtained in the same manner as in Example 1 except that the thickness of the aluminum plate was set at 1 mm.

Comparative Example 6

An aluminum decorative plate was obtained in the same manner as in Example 1 except that the thickness of the aluminum plate was set at 0.4 mm.

Comparative Example 7

An aluminum decorative plate was obtained in the same manner as in Example 1 except that the laminate made of the fluorine resin layer and the acrylic resin layer was changed to a single acrylic resin layer with a thickness of 80μ.

<Judgment on Evaluations>
The aluminum decorative plates of the above examples and comparative examples were subjected to the following evaluation and judgment.

(Evaluation of Incombustibility)
An ignitability test was carried out using a cone calorimeter testing machine conforming to ISO 5660-1 and according to the fire protection and fireproofing test method and the performance evaluation standards based on Paragraph 9 of Article 2 of the Japanese Building Standards Act and Paragraph 2 of Article 108 of the Regulations of the Building Standards Act.

The case that a total heat value (MJ/m$^2$) over 20 minutes after commencement of heating was not larger than 8 MJ/m$^2$ and a maximum heat release rate did not exceed 200 KW/m$^2$ continuously over 10 seconds for 20 minutes after commencement of heating was evaluated as acceptable "○". In this regard, it was also made a condition that the substrate was free of cracks or voids.

(Bending Processing Test)

The bending processing was evaluated in the following way.

More particularly, a test was carried out, in which an intended aluminum decorative plate was bent by an angle of 90° by use of a 2R jig in an environment of 23° C.±2° C.

The case that no cracks were found at the bent portion was evaluated as acceptable "○".

(Weatherability)

Using a metal weather, the weatherability test was carried out in the following way.

After an irradiation mode under the following conditions was carried out for 20 hours, a dew condensation mode under the following conditions was performed for 4 hours, which was taken as one cycle (24 hours) and performed over 312 hours.

Illumination mode: illumination intensity of 65 mW/cm² (measured with Unimeter UIT-101, manufactured by Ushio Inc.), BP temperature of 53° C., humidity of 50%, and 20 hours irradiation.

Dew condensation mode: 30° C., 98% and 4 hours (shower spraying for 30 seconds prior to and after the des condensation mode).

The test was carried out under such conditions as indicated above for 312 hours, after which an appearance was visually confirmed with respect to the degree of its color degradation and the peeling. The case that there were no considerable degree of color change and degradation and the peeling was evaluated as acceptable "○".

(Solvent Resistance)

The solvent resistance was evaluated as follows.

A piece of absorbent cotton was soaked in methyl ethyl ketone and the surface of a decorative plate was wiped with the cotton piece by twenty reciprocations.

The case of no swelling or dissolution on the surface was evaluated as acceptable "○".

The results of the evaluations are shown in Tables 15 and 16.

TABLE 15

|  |  |  | Example 1 | | Example 2 | | Example 3 | | Example 4 | |
| --- | --- | --- | --- | --- | --- | --- | --- | --- | --- | --- |
|  |  |  | Mass ratio (wt %) | Thickness (layer ratio) | mass ratio (wt %) | Thickness (layer ratio) | Mass ratio (wt %) | Thickness (layer ratio) | Mass ratio (wt %) | Thickness (layer ratio) |
| Decorative sheet portion | Transparent thermoplastic resin layers | PVDF resin |  | 2(10) |  | 8(10) |  | 8(12) |  | 8(10) |
|  |  | PMMA resin | 40 | 18(90) | 40 | 72(90) | 70 | 72(90) | 70 | 72(90) |
|  |  | PMMA resin-based rubber | 60 |  | 60 |  | 30 |  | 30 |  |
|  |  | total thickness (μm) |  | 20 |  | 80 |  | 80 |  | 80 |
|  | Colored thermoplastic resin layer (thickness μm) |  | PP resin 70μ | | PP resin 70μ | | PP resin 70μ | | PP resin 70μ | |
| Aluminum substrate portion | aluminum substrate thickness (mm) Aluminum substrate |  | 0.5 | | 0.5 | | 0.5 | | 0.8 | |
| Results of evaluation | evaluation of incombustibility |  | ○ | | ○ | | ○ | | ○ | |
|  | bending processing test |  | ○ | | ○ | | ○ | | ○ | |
|  | weatherability |  | ○ | | ○ | | ○ | | ○ | |
|  | solvent resistance |  | ○ | | ○ | | ○ | | ○ | |

TABLE 16

|  |  |  | Comparative Example 1 | | Comparative Example 2 | | Comparative Example 3 | | Comparative Example 4 | |
| --- | --- | --- | --- | --- | --- | --- | --- | --- | --- | --- |
|  |  |  | Weight ratio (wt %) | Thickness (layer ratio) | Weight ratio (wt %) | Thickness (layer ratio) | Weight ratio (wt %) | Thickness (layer ratio) | Weight ratio (wt %) | Thickness (layer ratio) |
| Decorative sheet portion | Transparent thermoplastic resin layer | PVDF resin |  | 8(10) |  | 8(10) |  | 1(10) |  | 10(10) |
|  |  | PMMA resin | 20 | 72(90) | 40 | 72(90) | 70 | 9(90) | 70 | 90(90) |
|  |  | PMMA resin-based rubber | 80 |  | 60 |  | 30 |  | 30 |  |
|  |  | total thickness (μm) |  | 80 |  | 80 |  | 10 |  | 100 |
|  | Colored substrate thickness (mm) |  | PP resin 70μ | | PP resin 70μ | | PP resin 70μ | | PP resin 70μ | |
| Aluminum substrate portion | Aluminum substrate thickness (mm) |  | 0.5 | | 0.5 | | 0.5 | | 0.5 | |
| Results of evaluations | evaluation of incombustibility |  | x | | ○ | | ○ | | ○ | |
|  | bending processing test |  | ○ | | x | | ○ | | x | |

TABLE 16-continued

|  |  |  |  |  |  |  |  |
|---|---|---|---|---|---|---|---|
|  | weatherability |  | ○ | ○ | x | ○ |  |
|  | solvent resistance |  | ○ | ○ | ○ | ○ |  |

|  |  |  | Comparative Example 4 | | Comparative Example 5 | | Comparative Example 6 | |
|---|---|---|---|---|---|---|---|---|
|  |  |  | weight ratio (wt %) | Thickness (layer ratio) | weight ratio (wt %) | Thickness (layer ratio) | weight ratio (wt %) | Thickness (layer ratio) |
| Decorative sheet portion | Transparent thermoplastic resin layer | PVDF resin |  | 2(10) |  | 2(10) |  |  |
|  |  | PMMA resin | 40 | 18(90) | 40 | 18(90) | 40 | 80(100) |
|  |  | PMMA resin-based rubber | 60 |  | 60 |  | 60 |  |
|  |  | total thickness (μm) |  | 20 |  | 20 |  | 80 |
|  | Colored substrate thickness (mm) |  | PP resin 70μ | | PP resin 70μ | | PP resin 70μ | |
| Aluminum substrate portion | Aluminum substrate thickness (mm) |  | 1 | | 0.4 | | 0.5 | |
| Results of evaluations | evaluation of incombustibility |  | ○ | | x | | x | |
|  | bending processing test |  | x | | ○ | | ○ | |
|  | weatherability |  | ○ | | ○ | | ○ | |
|  | solvent resistance |  | ○ | | ○ | | x | |

As will be seen from Tables 15 and 16, with the case of Examples 1 to 4 wherein the ranges of the invention are satisfied in such a way that: the outermost layer 5 of the transparent thermoplastic resin layer is made of polyvinylidene fluoride resin and the inside layer 4 of the transparent thermoplastic resin layer is made of a mixture of polymethyl methacrylate resin and polymethyl methacrylate resin-based rubber; a mixing ratio therebetween is such that the polymethyl methacrylate resin ranges from 40 mass % to 70 mass % and the polymethyl methacrylate resin-based rubber ranges from 30 mass % to 60 mass %: and the total thickness of the transparent thermoplastic resin layers is from 20 μm to 80 μm, the incombustibility, weatherability and solvent resistance are all good.

Further, when the thickness of the aluminum plate is set within a range of 0.5 mm to 0.8 mm while satisfying the above configuration, the bending processability has been found good.

It will be noted that Comparative Example 6 is such that although the bending processability is evaluated as acceptable, cracks occur in the substrate with respect to the evaluation of the incombustibility because the thickness of the aluminum plate is less than 0.5 mm.

Further, it will be seen that when the ratio in thickness between the outermost layer 5 and the inside layer 4 of the transparent thermoplastic resin layer is set within a range of 10:90 to 40:60, it becomes possible to provide an aluminum incombustible decorative sheet 10 having incombustibility conforming to ISO 5660-1.

Ninth Example

Example 1

A resin composition, which was prepared by formulating 10 parts by mass of crosslinked particles of a 2-hydroxyethyl methacrylate-copolymerized polymethyl methacrylate having a thermal deformation temperature of 115° C. and serving as a matting agent in 100 parts by mass of a transparent acrylic-based resin having a thermal deformation temperature (JIS K 7207) of 100° C. and made of an acrylic rubber and an acrylic resin, was extruded into a 50 μm thick film to provide a transparent matte sheet.

A polypropylene resin film (with a thickness of 70 μm) having a mass of organic solids of 60.4 g/m² was provided as a substrate layer 1, and a design layer 2 of a grain pattern was formed by printing on its surface using a urethane printing ink.

The following mixture was used as the acrylic-based resin made of the acrylic rubber and the acrylic resin.

Acrylic resin (constituent units; methyl methacrylate): 45 parts by mass Acrylic rubber ("SA-FW 001" (commercial name), manufactured by Kuraray Co., Ltd., methacrylic resin, constituent units: methyl methacrylate, particulate, an average particle size: 100 nm): 55 parts by mass Further, a heat sealing agent (acrylic/vinyl chloride acetate/polyester=1/1/1, formulated with an isocyanate curing agent) was coated onto the substrate layer 1, on which the design layer 2 had been formed, in a dry thickness of 1 μm to form an adhesion layer 3. The transparent matte sheet was superposed on the surface of the adhesion layer 3, followed by thermal lamination under conditions of a film surface temperature of 120° C.

A grain vessel channel pattern was embossed on the surface of the transparent matte sheet under conditions of a sheet surface temperature of 120° C. Finally, a urethane primer, to which silica powder was added, was applied onto the back surface of the substrate layer 1 in a dry thickness of 1 μm to form a back surface primer layer 30 thereby preparing an incombustible decorative sheet of Example 1.

Example 2

An incombustible decorative sheet was obtained in the same manner as in Example 1 except that a 5μ thick polyvinylidene fluoride resin and such a mixture for the formation of acrylic resin layer as described in Example 1 were melted and extruded by a T die to form a laminate of the fluorine resin layer and the acrylic resin layer.

Comparative Example 1

An incombustible decorative sheet was obtained in the same manner as in Example 1 except that the total mass of organic solids was 77.6 g/m² (thickness: 90µ).

Comparative Example 2

An incombustible decorative sheet was obtained in the same manner as in Example 1 except that the total mass of organic solids was 40.0 g/m² (thickness: 50µ).

Comparative Example 3

An incombustible decorative sheet was obtained in the same manner as in Example 1 except for changing the matting agent to acrylic-based crosslinked particles having a thermal deformation temperature of 105° C.

<Evaluation-On-Judgment Method>
<Lamination Appropriateness>

For evaluating the appropriateness of lamination, a sheet that was susceptible to wrinkling and cracking upon the thermal lamination was judged as "x". The others were evaluated as "○".

<Evaluation of Incombustibility>

The case that a total heat value (MJ/m²) over 20 minutes after commencement of heating is not larger than 8 MJ/m² and a maximum heat release rate does not exceed 200 KW/m² continuously over 10 seconds for 20 minutes after commencement of heating according to ISO 5660-1 was evaluated as acceptable "○". In this regard, it was also made a condition that the substrate was free of cracks or voids.

<Measurement of Surface Gloss>

In order to evaluate the surface gloss, the respective sheets were subjected to measurement of a 60° surface gloss at the time immediately after the making and at the time of allowing to stand over 1 hour in an environment of different temperatures of 60 to 80° C. In this regard, however, positions to be measured were properly selected while excluding embossed recesses. The results are shown in Table 1. In Table 1, a gloss immediately after the making is taken as a reference, and "Δ" indicates gloss rise and "∇" indicates gloss lowering.

The results of the evaluations are shown in Table 17.

[Results of Evaluation]

TABLE 17

|  | Example | | Comparative Example | | |
|---|---|---|---|---|---|
|  | 1 | 2 | 1 | 2 | 3 |
| Fluorine resin layer | | | | | |
| thickness (µm) | | 5 | | | |
| Acrylic resin layer | | | | | |
| thickness (µm) | 50 | 45 | 50 | 50 | 50 |
| base acrylic resin Tg (° C.) | 100 | 100 | 100 | 100 | 100 |
| matting agent Tg (° C.) | 115 | 115 | 115 | 115 | |
| Heat sealing agent acrylic/vinyl chloride acetate/polyester = 1/1/1 | yes | yes | yes | yes | yes |
| Coating amount (g/m²) | 1.5 | 1.5 | 1.5 | 1.5 | 1.5 |
| Substrate | PP-based print sheet | PP-based print sheet | PP-based printing sheet | PP-based printing sheet | PP-based printing sheet |
| Total weight of organic solids (g/m²) | 60.4 | 60.4 | 77.6 | 40 | 60.4 |
| Wrapping: adhesive layer urethane adhesive | yes | yes | yes | yes | yes |
| Metal substrate | aluminum alloy plate | aluminum alloy plate | aluminum alloy plate | aluminum alloy plate | aluminum alloy plate |
| Lamination appropriateness | ○ | ○ | ○ | x | ○ |
| Evaluation of incombustibility | ○ | ○ | x | ○ | ○ |
| Measurement of surface gloss | gloss variation small judgment: ○ | gloss variation small judgment: ○ | gloss variation small judgment: ○ | gloss variation small judgment: ○ | gloss variation large judgment: x |
| 60° C., 1 hour | Δ 1.0 | Δ 1.0 | Δ 1.0 | Δ 1.0 | Δ 1.0 |
| 65° C., 1 hour | Δ 1.0 | Δ 1.0 | Δ 1.0 | Δ 1.0 | Δ 1.0 |
| 70° C., 1 hour | Δ 1.0 | Δ 1.0 | Δ 1.0 | Δ 1.0 | Δ 2.0 |
| 75° C., 1 hour | Δ 1.0 | Δ 1.0 | Δ 1.0 | Δ 1.0 | Δ 2.5 |

As will be seen from Table 17, the incombustibility conforming to ISO 5660-1 is ensured in Examples 1, 2 wherein the ratio by mass between the acrylic rubber and the acrylic resin constituting the matte sheet layer is set within a range of 30:70 to 60:40, the thickness of the acrylic resin layer constituting the matte sheet layer is set at from 20 μm to 55 μm, and the thickness of the substrate is set at from 50 μm to 75 μm.

In Examples 1, 2, it will also be seen that the lamination appropriateness and the surface gloss are both good.

When Example 1 was carried out in such a way that the thickness of the acrylic resin layer was adjusted to 20 μm or 55 μm and the organic solid content was adjusted correspondingly to a thickness of the substrate of 50 μm or 75 μm, similar effects as in Example 1 were obtained.

REFERENCE SIGNS LIST 1 substrate layer
2 design pattern layer
3 adhesion layer
3a adhesive layer
3b anchor layer
4 weather-resistant resin layer
5 fluorine resin layer
6 adhesive layer
7 metal substrate
10 incombustible decorative sheet
20 metal decorative member
30 back surface primer layer
40 matte sheet layer
51 anodized film
52 coating film layer

What is claimed is:

1. An incombustible decorative sheet, comprising:
   two or more thermoplastic resin layers laminated on a substrate layer,
   an outermost layer of the thermoplastic resin layers being a fluorine resin layer made of a fluorine resin,
   an inside layer other than the outermost layer of the thermoplastic resin layers serving as a weather-resistant resin layer made of a mixture of an acrylic resin and an acrylic resin-based rubber having a ratio by mass between the acrylic resin-based rubber and the acrylic resin set within a range of 30:70 to 60:40, and
   a design pattern layer with a design pattern thereon and an adhesion layer being provided between the substrate layer and the two or more thermoplastic resin layers,
   wherein the two or more thermoplastic resin layers serve as a transparent thermoplastic resin layer having a transparency sufficient to enable the design pattern of the design pattern layer to be visible,
   wherein the adhesion layer has two layers including an adhesive layer made of a urethane adhesive that contains an isocyanate compound as a curing agent and has a polyester resin as a main chain, and an anchor layer made of a urethane anchoring agent that contains an isocyanate compound as a curing agent and has an acrylic resin as a main chain, the adhesive layer being disposed at a side of the substrate layer, and
   wherein a ratio in thickness between the fluorine resin layer and the weather-resistant resin layer is within a range of 10:90 to 40:60 whereby incombustibility is imparted to the sheet.

2. The incombustible decorative sheet of claim 1, wherein the substrate layer is made of a polyolefin resin with its thickness being from 30 μm to 70 μm, inclusive, and a total thickness of the decorative sheet is from 80 μm to 130 μm, inclusive.

3. The incombustible decorative sheet of claim 1, wherein an ultraviolet absorber is further added to the urethane anchoring agent.

4. The incombustible decorative sheet of claim 1, wherein the adhesion layer is made of a thermal activation type heat-sensitive adhesive.

5. The incombustible decorative sheet of claim 1, wherein the weather-resistant resin layer contains at least one ultraviolet absorber selected from benzotriazole ultraviolet absorbers and triazine ultraviolet absorbers, wherein a total thickness of the decorative sheet is set at not larger than 200 μm, and, wherein a total thickness of the two or more thermoplastic resin layers is set at not less than 20 μm to not larger than 80 μm.

6. The incombustible decorative sheet of claim 1, wherein the weather-resistant resin layer constitutes a matte sheet layer to which a matting agent is added, wherein a thickness of the substrate layer is set at not less than 50 μm to not large than 75 μm, wherein the thickness of the matte sheet layer is set at not less than 20 μm to not larger than 55 μm, and wherein the matting agent is made of acrylic-based crosslinked particles having a thermal deformation temperature (JIS K 7207) higher than an acrylic resin constituting the matte sheet layer.

7. The incombustible decorative sheet of claim 6, wherein the acrylic-based crosslinked particles are polymethyl methacrylate-based crosslinked particles containing as a copolymerizing component a hydroxyalkyl acrylate and/or a hydroxyalkyl methacrylate.

8. The incombustible decorative sheet of claim 1, wherein an uneven pattern is formed on the weather-resistant resin layer.

9. The incombustible decorative sheet of claim 1, wherein a constituent fluorine resin of the fluorine resin layer is a polyvinylidene resin.

10. The incombustible decorative sheet of claim 1, wherein the substrate layer is made of a colored polypropylene resin colored by mixing of at least one of an organic pigment and an inorganic pigment.

11. The incombustible decorative sheet of claim 1, wherein the substrate layer is made of a polypropylene resin and has a weight of organic solids of not less than 44 g/m² to not larger than 67 g/m².

12. A metal decorative member having incombustibility, comprising the incombustible decorative sheet of claim 1 laminated to a substrate of a metal selected from aluminum, Galvalume, iron, stainless steel and copper.

13. A metal decorative member having incombustibility, comprising an aluminum substrate laminated on the substrate layer side of the incombustible decorative sheet defined in claim 1 through a second adhesive layer, and wherein the second adhesive layer is formed of a reaction-type hot melt adhesive or a two-part curing urethane resin using an isocyanate as a curing agent.

14. The metal decorative member having incombustibility of claim 13, wherein the weight of the reaction-type hot melt adhesive in the second adhesive layer is from 37 g/m² to 46 g/m², inclusive.

15. A metal decorative member having incombustibility, comprising:
   an anodized film and a coating film layer formed on a metal substrate by baking and finishing in this order and laminating to a substrate layer side of the incombustible decorative sheet of claim 1 through a urethane resin-based adhesive layer.

16. The metal decorative member having incombustibility of claim 15,
wherein the coating film resin is an acrylic resin, a melamine resin, a fluorine resin or a mixed resin of two or more thereof.

17. The metal decorative member having incombustibility of claim 15,
wherein the solids weight of the urethane resin-based adhesive layer is from 15.0 g/m$^2$ to 26.4 g/m$^2$, inclusive.

18. A metal decorative member having incombustibility, comprising
a composite panel, with a mixed resin layer containing a polyethylene resin and aluminum hydroxide and sandwiched between metal plates laminated to a substrate layer side of the incombustible decorative sheet of claim 1.

19. A metal decorative member, comprising
an aluminum plate used as a substrate and laminated to a substrate layer side of the incombustible decorative sheet of claim 1,
wherein the fluorine resin constituting the fluorine resin layer is a polyvinylidene fluoride resin,
wherein the acrylic resin constituting the weather-resistant resin layer is a polymethyl methacrylate resin and the acrylic resin-based rubber is a polymethyl methacrylate resin-based rubber,
wherein a total thickness of the two or more thermoplastic resins is from 20 μm to 80 μm, inclusive, and,
wherein a thickness of the aluminum plate is from 0.5 mm to 0.8 mm, inclusive.

20. A metal decorative member having incombustibility, comprising
a metal decorative member obtained by laminating, to an aluminum plate, the incombustible decorative sheet of claim 1, with the metal decorative member being formed after bending.

21. A method for making a metal decorative sheet, comprising
heating at least a portion of the metal decorative member of claim 20 being heated to be bent and subsequently subjecting to bending.

* * * * *